(12) United States Patent
Miyoshi

(10) Patent No.: US 8,961,868 B2
(45) Date of Patent: Feb. 24, 2015

(54) NANOCOMPOSITE BULK MAGNET AND PROCESS FOR PRODUCING SAME

(75) Inventor: Toshio Miyoshi, Osaka (JP)

(73) Assignee: Hitachi Metals, Ltd., Tokyo (JP)

( * ) Notice: Subject to any disclaimer, the term of this patent is extended or adjusted under 35 U.S.C. 154(b) by 819 days.

(21) Appl. No.: 13/260,758

(22) PCT Filed: Mar. 30, 2010

(86) PCT No.: PCT/JP2010/002321
§ 371 (c)(1),
(2), (4) Date: Sep. 28, 2011

(87) PCT Pub. No.: WO2011/113482
PCT Pub. Date: Oct. 7, 2010

(65) Prior Publication Data
US 2012/0021221 A1    Jan. 26, 2012

(30) Foreign Application Priority Data
Mar. 31, 2009 (JP) ................. 2009-086337

(51) Int. Cl.
*B22F 3/14* (2006.01)
*B22F 1/00* (2006.01)
*H01F 1/057* (2006.01)
(Continued)

(52) U.S. Cl.
CPC ......... *H01F 1/0579* (2013.01); *B22F 2009/041* (2013.01); *B22F 2998/10* (2013.01); *B82Y 25/00* (2013.01); *C22C 33/0278* (2013.01); *C22C 38/005* (2013.01); *H01F 1/0576* (2013.01); *H01F 41/0266* (2013.01)
USPC ................ 419/33; 419/23; 148/101; 148/302

(58) Field of Classification Search
CPC .................................................. H01F 1/0536

USPC ........................................................... 419/33
See application file for complete search history.

(56) References Cited

U.S. PATENT DOCUMENTS 5,049,208 A * 9/1991 Yajima et al. ................. 148/302
5,100,485 A   3/1992 Yamashita et al.
(Continued)

FOREIGN PATENT DOCUMENTS

| JP | 02-260615 A | 10/1990 |
| JP | 2004-014906 A | 1/2004 |
| JP | 2008-078614 A | 4/2008 |

OTHER PUBLICATIONS

English translation of Official Communication issued in corresponding International Application PCT/JP2010/002321, mailed on Nov. 24, 2011.
(Continued)

*Primary Examiner* — George Wyszomierski
*Assistant Examiner* — Ngoclan T Mai
(74) *Attorney, Agent, or Firm* — Keating & Bennett, LLP

(57) ABSTRACT

In a nanocomposite bulk magnet according to the present invention, nanocomposite magnet powder particles, including an $Nd_2Fe_{14}B$ crystalline phase and an $\alpha$-Fe phase, are combined together. The composition of the magnet is represented by $T_{100-x-y-z-n}(B_{1-q}C_q)_x R_y Ti_z M_n$, where T is at least one transition metal element selected from the group consisting of Fe, Co and Ni and always including Fe, R is at least one rare-earth element including substantially no La or Ce, M is an additive metallic element, and x, y, z, n and q satisfy 4 at %$\leq$x$\leq$10 at %, 6 at %$\leq$y$\leq$10 at %, 0.05 at %$\leq$z$\leq$5 at %, 0 at %$\leq$n$\leq$10 at %, and 0$\leq$q$\leq$0.5, respectively. The powder particles have a minor-axis size of less than 40 μm. And powder particles, of which the major-axis size exceeds 53 μm, account for at least 90 mass % of the entire magnet. And those powder particles are directly combined with each other. Consequently, a full-dense magnet, of which the density is 96% or more of the true density of its material alloy, is realized.

4 Claims, 9 Drawing Sheets

(51) Int. Cl.
*B82Y 25/00* (2011.01)
*C22C 33/02* (2006.01)
*C22C 38/00* (2006.01)
*H01F 41/02* (2006.01)
*B22F 9/04* (2006.01)

(56) References Cited

U.S. PATENT DOCUMENTS

| | | |
|---|---|---|
| 5,872,501 A | 2/1999 | Hamano et al. |
| 6,183,571 B1 | 2/2001 | Inoue et al. |
| 6,790,296 B2 | 9/2004 | Kanekiyo et al. |
| 7,842,140 B2 | 11/2010 | Kanekiyo et al. |
| 2003/0062097 A1 | 4/2003 | Shimada et al. |
| 2004/0099346 A1* | 5/2004 | Nishiuchi et al. ............ 148/302 |
| 2009/0129966 A1 | 5/2009 | Kanekiyo et al. |

OTHER PUBLICATIONS

Official Communication issued in International Patent Application No. PCT/JP2010/002321, mailed on Jun. 8, 2010.

* cited by examiner

FIG.3
(a)
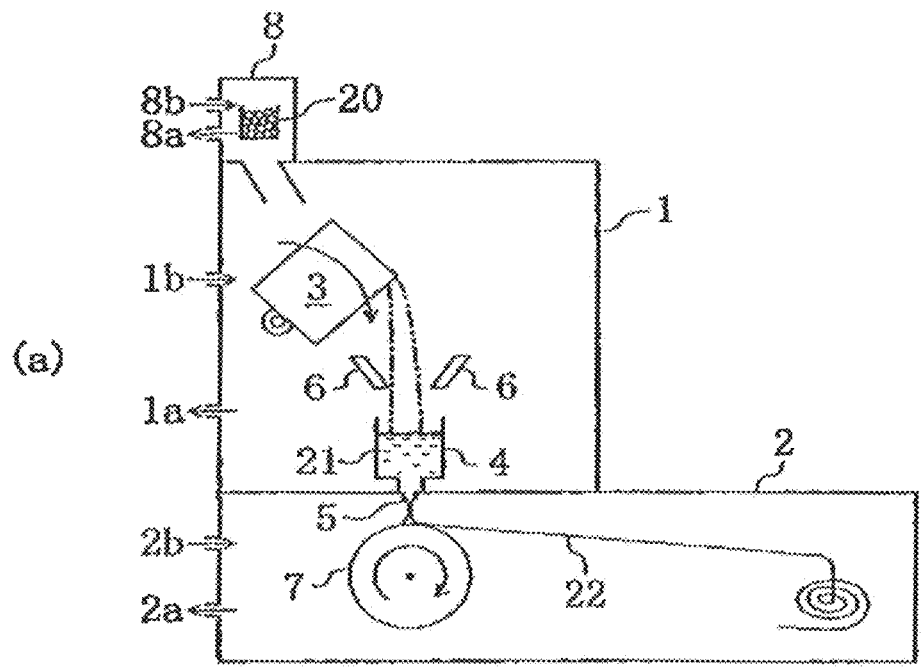
(b)
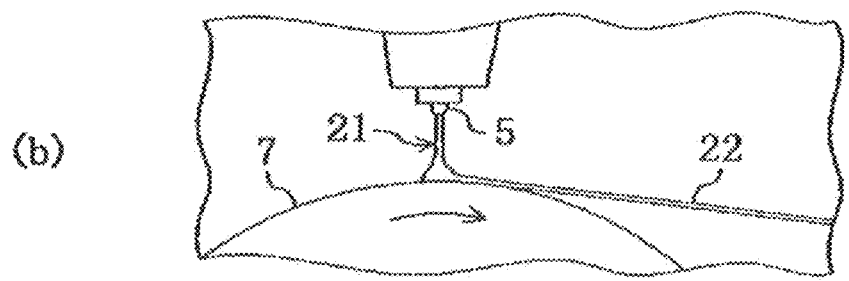

*FIG.10*
×100
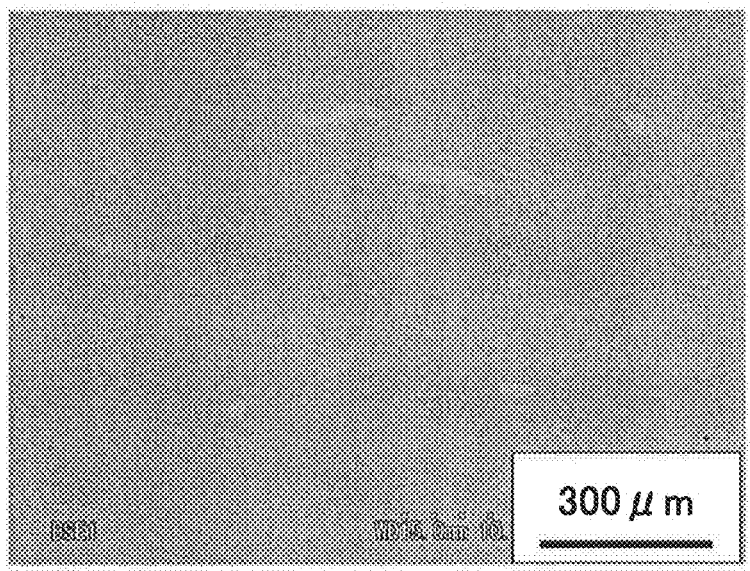
300 μm
×20k
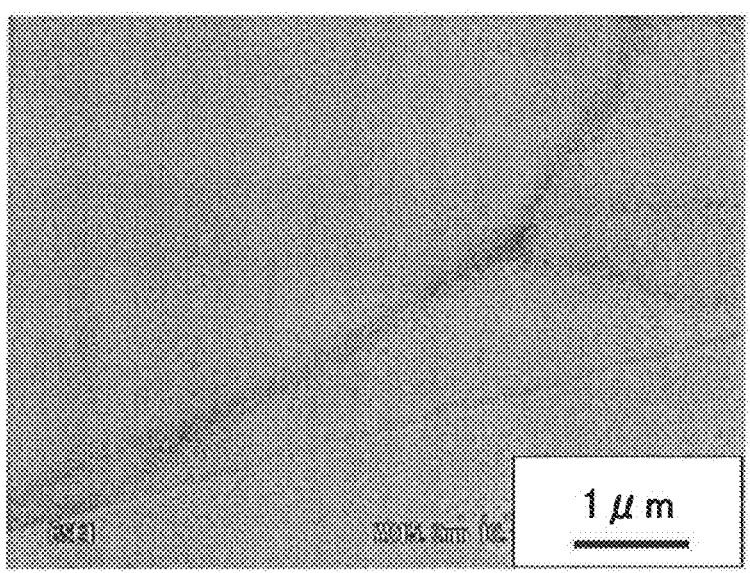
1 μm

NANOCOMPOSITE BULK MAGNET AND PROCESS FOR PRODUCING SAME

TECHNICAL FIELD

The present invention relates to a nanocomposite bulk magnet, including an $Nd_2Fe_{14}B$ phase (as a hard magnetic phase) and an α-Fe phase (as a soft magnetic phase) in the same metal structure, and a method for producing such a magnet.

BACKGROUND ART

A nanocomposite permanent magnet, including a hard magnetic phase such as an $Nd_2Fe_{14}B$ phase with a very small size of a nanometer scale and soft magnetic phases such as α-Fe in the same metal structure (which will be referred to herein as a "nanocomposite magnet"), is currently under development. In a nanocomposite magnet, crystal grains are magnetically coupled together via exchange interactions and therefore, the nanocomposite magnet has excellent performance.

In the field of electronic products including small-sized motors and sensors, magnets with high remanence are in high demand. To increase the remanence of a nanocomposite magnet to meet this demand, it is effective to increase the percentage of the α-Fe phase to the overall nanocomposite magnet. This is because since the saturation magnetization of the α-Fe phase is higher than that of the $Nd_2Fe_{14}B$ phase or that of the Fe—B phase, the increase in the percentage of the α-Fe phase to the nanocomposite magnet means that the overall magnet will have increased remanence.

Patent Documents Nos. 1 and 2 disclose α-Fe based nanocomposite magnets. In these nanocomposite magnets, most of their soft magnetic phases is α-Fe. That is why these nanocomposite magnets are expected to achieve a high remanence of 0.9 T or more. However, the conventional α-Fe based nanocomposite magnets have a coercivity of 400 kA/m or less, which is too low to use them in actual products.

The applicant of the present application developed an α-Fe based nanocomposite magnet, in which α-Fe phases with a significantly decreased size are distributed on the grain boundary of $Nd_2Fe_{14}B$ crystal grains by suppressing the nucleation and growth of the α-Fe phases with Ti added, and disclosed such a magnet in Patent Documents Nos. 3 and 4. That nanocomposite magnet has as high a remanence $B_r$ as 0.9 T or more and a coercivity $H_{cJ}$ of more than 400 kA/m, and can be used effectively to make a bonded magnet. And those patent documents say that the bonded magnet also has as high a remanence $B_r$ as 0.6 T or more. The applicant of the present application further disclosed a bulk magnet of a Ti-including nanocomposite magnet in Patent Document No. 5.

CITATION LIST

Patent Literature

Patent Document No. 1: Japanese Patent Application Laid-Open Publication No. 8-162312
Patent Document No. 2: Japanese Patent Application Laid-Open Publication No. 10-53844
Patent Document No. 3: PCT International Application Publication No. 2006/064794
Patent Document No. 4: PCT International Application Publication No. 2006/101117
Patent Document No. 5: Japanese Patent Publication No. 4089304

SUMMARY OF INVENTION

Technical Problem

Patent Documents Nos. 3 and 4 do disclose a bonded magnet made from a nanocomposite magnet powder but do not disclose a bulk magnet. Generally speaking, a bonded magnet is a magnet obtained by compounding a magnetic powder with a resin, and therefore, includes a non-magnetic-powder component (i.e., which is a resin that is not a magnetic body) at a volume fraction of 10 to 40%. That is why the density of such a bonded magnet should be less than 90%, which is the density of the alloy that forms an essential part of the magnet (i.e., its true density). As a result, as the volume fraction of the resin component to the bonded magnet increases, the overall magnetic properties of the bonded magnet deteriorate. On the other hand, a bulk magnet is a magnet obtained by pressing and compressing a magnetic powder so that the magnetic powder particles themselves are directly combined with each other, and therefore, does not include a resin or any other non-magnetic component. For that reason, the bulk magnet has an overall density that is close to the density of its magnetic components (i.e., its true density), and therefore, is also called a "full-dense magnet" and has magnetic properties that are superior to those of the bonded magnet.

The present inventors discovered that if the nanocomposite magnet powder disclosed in Patent Documents Nos. 3 and 4 was used to make such a bulk magnet, then the percentage of the voids in the bulk magnet could not be sufficiently small. That is to say, if a bulk magnet was made from the magnetic powder disclosed in Patent Documents Nos. 3 and 4 by performing a known manufacturing process, then its density would not be 96% or more of its true density. Furthermore, in a bulk magnet made from the Ti-including nanocomposite magnet disclosed in Patent Document No. 5, its density is only 94% of the true density of the alloy. Thus, according to the method disclosed in Patent Document No. 5, a bulk magnet, of which the density is 96% or more of the true density of the alloy, cannot be obtained. The reasons will be described in detail later.

It is therefore an object of the present invention to provide an α-Fe based nanocomposite bulk magnet, of which the density has been increased to at least 96% (and preferably to 98% or more) of its true density and of which the magnetic properties are better than those of a bonded magnet.

Solution to Problem

A nanocomposite bulk magnet according to the present invention has a composition represented by the compositional formula: $T_{100-x-y-z-n}(B_{1-q}C_q)_x R_y Ti_z M_n$, where T is at least one transition metal element that is selected from the group consisting of Fe, Co and Ni and that always includes Fe, R is at least one rare-earth element including substantially no La or Ce, and M is at least one metallic element selected from the group consisting of Al, Si, V, Cr, Mn, Cu, Zn, Ga, Zr, Nb, Mo, Ag, Hf, Ta, W, Pt, Au and Pb, and the mole fractions x, y, z, n and q satisfy the inequalities of: 4 at %≤x≤10 at %, 6 at %≤y≤10 at %, 0.05 at %≤z≤5 at %, 0 at %≤n≤10 at %, and 0≤q≤0.5, respectively. Nanocomposite magnet powder particles, including an $R_2T_{14}B$ phase and an α-Fe phase, are combined together. The powder particles have an average minor-axis size of less than 40 μm. Powder particles, of which the major-axis size exceeds 53 μm, account for at least 90 mass % of the entire magnet. And the density of the magnet is 96% or more of the true density of its material alloy.

In one preferred embodiment, the magnet has a nanocomposite magnet structure, of which 5 vol % to 60 vol % is accounted for by the α-Fe phase having an average crystal grain size of 1 nm to 50 nm and of which 40 vol % to 95 vol % is accounted for by the $R_2T_{14}B$ phase with an average crystal grain size of 5 nm to 100 nm.

In another preferred embodiment, 50 mass % or more of the powder particles have an aspect ratio of less than 0.4. The aspect ratio is defined as the ratio of the minor-axis size of the powder particles to their major-axis size.

In still another preferred embodiment, the powder particles have a volume fraction of 98% or more.

In yet another preferred embodiment, the powder particles have been pressed and directly combined together.

In yet another preferred embodiment, there is a metal layer between the powder particles, and the metal layer includes at least an Fe-rich phase, an R-rich phase, and a Ti-rich phase.

In this particular preferred embodiment, the metal layer has a thickness of 50 nm to 300 nm.

A rapidly solidified alloy powder according to the present invention has a composition represented by the compositional formula: $T_{100-x-y-z-n}(B_{1-q}C_q)_xR_yTi_zM_n$, where T is at least one transition metal element that is selected from the group consisting of Fe, Co and Ni and that always includes Fe, R is at least one rare-earth element including substantially no La or Ce, and M is at least one metallic element selected from the group consisting of Al, Si, V, Cr, Mn, Cu, Zn, Ga, Zr, Nb, Mo, Ag, Hf, Ta, W, Pt, Au and Pb, and the mole fractions x, y, z, n and q satisfy the inequalities of: 4 at %≤x≤10 at %, 6 at %≤y≤10 at %, 0.05 at %≤z≤5 at %, 0 at %≤n≤10 at %, and 0≤q≤0.5, respectively. The powder is made up of powder particles with a minor-axis size of less than 40 μm. Powder particles, of which the major-axis size exceeds 53 μm, account for at least 90 mass % of the entire alloy powder. And 30 vol % or more of the powder particles are crystalline phases.

A method for producing a nanocomposite bulk magnet according to the present invention includes the steps of: providing a melt of an alloy having a composition represented by the compositional formula: $T_{100-x-y-z-n}(B_{1-q}C_q)_xR_yTi_zM_n$, where T is at least one transition metal element that is selected from the group consisting of Fe, Co and Ni and that always includes Fe, R is at least one rare-earth element including substantially no La or Ce, and M is at least one metallic element selected from the group consisting of Al, Si, V, Cr, Mn, Cu, Zn, Ga, Zr, Nb, Mo, Ag, Hf, Ta, W, Pt, Au and Pb, and the mole fractions x, y, z, n and q satisfy the inequalities of: 4 at %≤x≤10 at %, 6 at %≤y≤10 at %, 0.05 at %≤z≤5 at %, 0 at %≤n≤10 at %, and 0≤q≤0.5, respectively; quenching the melt to make a rapidly solidified alloy, at least 30 vol % of which is crystalline phases that include an $R_2T_{14}B$ phase and an α-Fe phase and that have an average crystal grain size of 100 nm or less and the balance of which is amorphous phases and which has a thickness of less than 40 μm; pulverizing the rapidly solidified alloy, thereby obtaining a powder, at least 90 mass % of which is accounted for by powder particles with a major-axis size of more than 53 μm; and compacting the powder while heating and pressing the powder, thereby making a bulk body in which nanocomposite magnet powder particles including the $R_2T_{14}B$ phase and the α-Fe phase are combined together and of which the density is 96% or more of the true density of the alloy.

In one preferred embodiment, the step of quenching the melt includes quenching the melt at a quenching rate of $5\times10^{4}$° C./s to $5\times10^{7}$° C./s.

In another preferred embodiment, the step of quenching the melt includes controlling the standard deviation σ of the thickness of the rapidly solidified alloy to 4 μm or less.

In still another preferred embodiment, the step of compacting includes crystallizing the amorphous phases of the powder particles, thereby forming a nanocomposite magnet structure, 5 vol % to 60 vol % of which is accounted for by an α-Fe phase with an average crystal grain size of 1 nm to 50 nm and 40 vol % to 95 vol % of which is accounted for by an $R_2T_{14}B$ phase with an average crystal grain size of 5 nm to 100 nm.

Advantageous Effects of Invention

The present invention provides a full-dense magnet with a high density by optimizing, for example, the powder particle size of a magnetic powder, of which the remanence and coercivity have both been increased to sufficiently high levels in practice by adding Ti.

The nanocomposite bulk magnet of the present invention has been turned into a bulk magnet by stacking flat magnetic powder particles one upon the other, and therefore, can be a full-dense magnet that has had its density increased with only minimum gaps left. In addition, according to the present invention, powder particles, which include a rare-earth element at too low a mole fraction to be oxidized easily, is used, and easily oxidizable fine powder particles are not included a lot. For that reason, its magnetic properties do not deteriorate easily during the compaction process to make a bulk magnet.

BRIEF DESCRIPTION OF DRAWINGS

FIG. 3(a) is a cross-sectional view illustrating an overall arrangement for a machine that is used to make a quenched alloy to make the iron-based rare-earth alloy nanocomposite magnet of the present invention and FIG. 3(b) is an enlarged view illustrating a portion of the machine where the melt is quenched and solidified.

FIG. 10 is micrographs showing a bulk magnet (as a specific example of the present invention) that was obtained at a compacting pressure of 392 MPa.

DESCRIPTION OF EMBODIMENTS

In a nanocomposite bulk magnet according to the present invention, the powder particles of a nanocomposite magnet, including an $Nd_2Fe_{14}B$ type crystalline phase and an α-Fe phase, are combined together. And the nanocomposite bulk magnet of the present invention has a composition represented by the compositional formula: $T_{100-x-y-z-n}(B_{1-q}C_q)_xR_y Ti_zM_n$.

T is at least one transition metal element that is selected from the group consisting of Fe, Co and Ni and that always includes Fe, R is at least one rare-earth element including substantially no La or Ce, and M is at least one metallic element selected from the group consisting of Al, Si, V, Cr, Mn, Cu, Zn, Ga, Zr, Nb, Mo, Ag, Hf, Ta, W, Pt, Au and Pb.

In this compositional formula, the mole fractions x, y, z, n and q satisfy the inequalities of 4 at %≤x≤10 at %, 6 at %≤y≤10 at %, 0.05 at %≤z≤5 at %, 0 at %≤n≤10 at %, and 0≤q≤0.5, respectively.

In the $Nd_2Fe_{14}B$ type crystal, part or all of Nd may be replaced with another rare-earth element and part of Fe may be replaced with a transition metal element such as Ni or Co. Also, according to the present invention, part of B in the $Nd_2Fe_{14}B$ type crystal may be replaced with C (carbon). In the description and claims of the present application, the $Nd_2Fe_{14}B$ type crystalline phase will sometimes be simply referred to herein as an "$Nd_2Fe_{14}B$ phase" when a preferred embodiment of the present invention is described.

Figure 11:
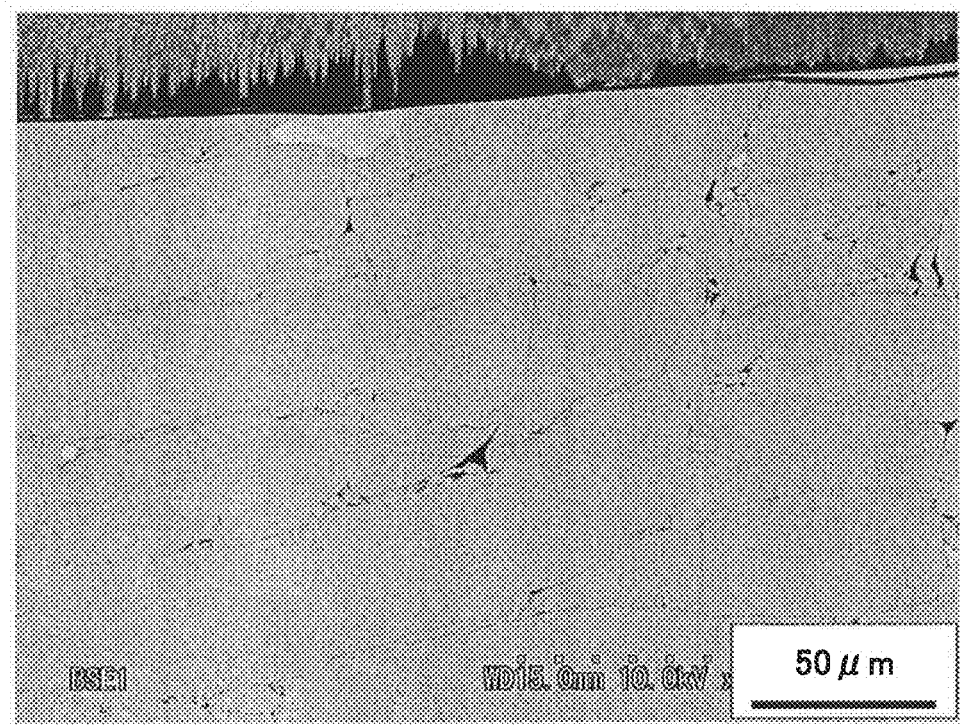
FIG. 11 is a photograph showing a cross section of an exemplary bulk magnet according to the present invention as viewed on a plane that is parallel to the pressing direction.

The powder particles that form the nanocomposite bulk magnet of the present invention have an average minor-axis size of less than 40 μm, and powder particles, of which the major-axis size exceeds 53 μm, account for at least 90 mass % of the entire magnet. The bulk magnet of the present invention is densely filled with flat powder particles, which have been stacked one upon the other and directly combined with each other. As a result, a full-dense magnet, of which the density is at least 96% of the true density of the alloy, is realized. The sizes of the powder particles that form the bulk magnet of the present invention can be obtained by measuring the minor- and major-axis sizes of respective powder particles that are observed around the center of a cross section of the bulk magnet of the present invention as viewed on a plane that is parallel to the compressing direction as shown in FIG. 11, for example.

In this description, if "the powder particles are directly combined with each other", then there is no binder such as resin between the powder particles that are combined. That is why even if a layer of a substance, of which the components have derived from the powder particles, between the powder particles as will be described later, those powder particles are also supposed to be "directly combined with each other".

Figure 1:
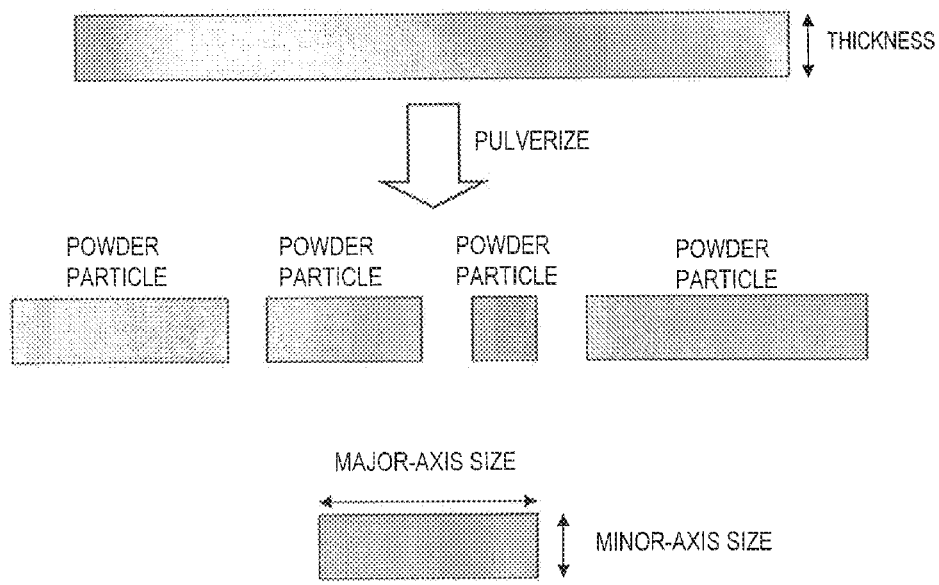
FIG. 1 is a cross-sectional view schematically illustrating a part of a rapidly solidified alloy ribbon and powder particles obtained by pulverizing the alloy.

FIG. 1 is a cross-sectional view schematically illustrating a portion of a rapidly solidified alloy ribbon and powder particles obtained by pulverizing the alloy according to the present invention. Those powder particles are basically formed by fracturing a ribbon of a rapidly solidified alloy that has an average thickness of less than 40 μm. That is why the minor-axis size of a powder particle, which has a major-axis size of 40 μm or more, corresponds to the thickness of the rapidly solidified alloy ribbon yet to be pulverized. In this case, the "average thickness" is obtained by measuring the thicknesses of the rapidly solidified alloy ribbon at 100 arbitrary points using a micrometer and then calculating their average. A fine powder particle with a major-axis size of less than 40 μm naturally should have a minor-axis size of less than 40 μm, and therefore, the minor-axis size of the powder particle is at most equal to the thickness of the rapidly solidified alloy. The major-axis size of the powder particles, on the other hand, can be greater than the thickness of the rapidly solidified alloy by controlling the pulverization process conditions.

According to the present invention, the quenching process conditions are controlled so that the rapidly solidified alloy will have a thickness of less than 40 μm with a standard deviation σ of 4 μm or less, and the conditions of the pulverization process to be performed on the rapidly solidified alloy thus obtained are controlled so that powder particles with a major-axis size of more than 53 μm account for 90 mass % or more of the entire powder. Most of those powder particles, except some fine particles, have a substantially flat shape. And in 50 mass % or more of the powder particles, the ratio of the minor-axis size to the major-axis size (i.e., the aspect ratio) is preferably less than 0.4. In this case, the standard deviation of the thickness is obtained by measuring the thicknesses, calculating their average and then calculating their standard deviation.

Figure 2:
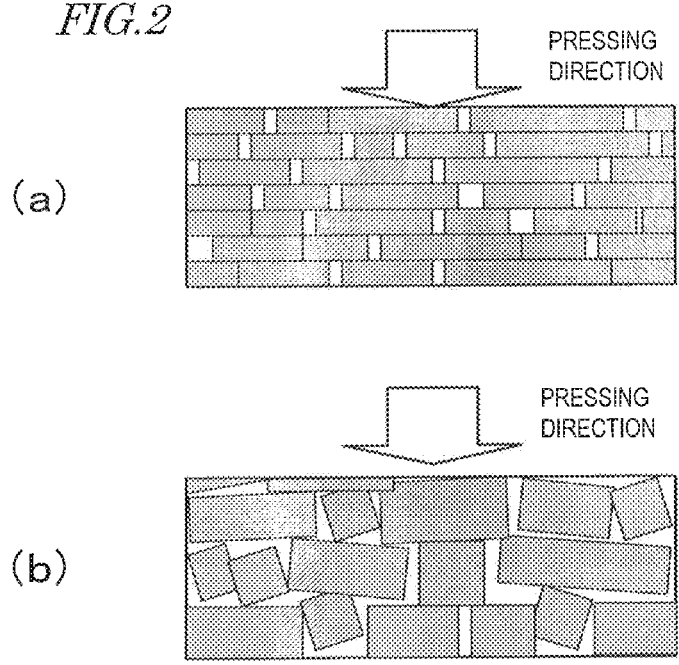
FIG. 2(a) is a cross-sectional view schematically illustrating how the nanocomposite bulk magnet of the present invention is loaded with powder particles and FIG. 2(b) is a cross-sectional view schematically illustrating how a comparative nanocomposite bulk magnet is loaded with powder particles.

Since most of the powder thus obtained is formed of substantially flat particles, those powder particles can be stacked one upon the other with no gaps left between them as shown in FIG. 2(a) when the powder is pressed and compacted. As a result, a highly dense bulk magnet can be produced. On the other hand, if fine powder particles (which will sometimes be simply referred to herein as "fine particles") with a major-axis size of 53 μm or less accounted for 10 mass % or more, those fine particles would be easily interposed between flat particles with a small aspect ratio, thus leaving a lot of gaps between them. In that case, the density of the bulk magnet would decrease so much that a full-dense magnet could not be obtained.

Nevertheless, it is not that the smaller the aspect ratio, the better. Considering the tap density when the powder is introduced into the cavity of a die, even powder particles that have an aspect ratio of less than 0.4 are preferably removed from the powder if their major-axis size is equal to or greater than 850 μm.

FIG. 2(b) schematically illustrates a cross section of a bulk body made up of powder particles that have been obtained by pulverizing a relatively thick rapidly solidified alloy. In this case, the powder particles have an aspect ratio that is rather close to one, and there are quite a few non-flat powder particles and a lot of fine particles that have a major-axis size of 53 μm or less. Then, no matter what countermeasure is taken, gaps will be easily left between those particles and it will be difficult to make a highly dense bulk magnet.

Although a Ti-including α-Fe based nanocomposite magnet bulk body, of which the density is at least 96% (and preferably 98% or more) of the true density of the alloy, can be made according to the present invention, such a bulk body is very hard to make according to the conventional technologies. The reason is that every conventional R—Fe—B based permanent magnet, other than nanocomposite magnets, has a so-called "R-rich phase" including a rare-earth element at a relatively high mole fraction in its structure. In the manufacturing process of a bulk magnet, the R-rich phase turns during a hot compaction process into a liquid phase, which contributes to increasing the density of the bulk compact. On the other hand, in the manufacturing process of an R—Fe—B based nanocomposite magnet, no such liquid phases are produced.

Furthermore, the conventional α-Fe based Ti including nanocomposite magnetic powder as disclosed in Patent Documents Nos. 3 and 4 is used as a magnetic powder to make a bonded magnet. And to increase the flowability of the compound, it is important to set the aspect ratio of a powder obtained by pulverizing the rapidly solidified alloy as close to one as possible. For that purpose, they believe it necessary to make the ribbon as thick as possible and those skilled in the art would never dream of making a thin rapidly solidified alloy to make a nanocomposite magnet. For example, according to Patent Document No. 3, a rapidly solidified alloy ribbon (or quenched alloy ribbon) with a thickness of 40 μm to 74 μm is obtained in its working example. However, even if the quenched alloy ribbon with such a thickness were pulverized under the known pulverization process conditions, it would be virtually impossible to obtain a magnetic powder, which have an average minor-axis size of less than 40 μm and at least 90 mass % of which is accounted for by powder particles having a major-axis size of more than 53 μm. In a working example of Patent Document No. 4, the thickness of the quenched alloy ribbon is not specified. However, since the quenched alloy ribbon of Patent Document No. 4 is made by rotating the roller at a lower surface velocity than in Patent Document No. 3, the quenched alloy ribbon obtained in the working example of Patent Document No. 4 should be at least as thick as, and probably thicker than, what is obtained in the working example of Patent Document No. 3. That is why if a bulk magnet is made of the magnetic powder that is specifically disclosed in Patent Document No. 3 or 4 under practical compaction process conditions that would neither deteriorate the magnetic properties nor damage the die, its density would be at most about 95% of the alloy's true density as will be described later with respect to specific examples of the present invention.

On the other hand, the bulk magnet of Patent Document No. 5 is made of a Ti-including nanocomposite magnetic powder. According to Patent Document No. 5, the particle size distribution of the quenched alloy powder is controlled by making powder particles with a major-axis size of 53 μm or less account for 10 mass % or more of the entire powder. The particle size distribution is also controlled so that 60% or more (which is determined by counting the numbers) of the particles with a major-axis size of more than 106 μm have an aspect ratio of 0.4 or more. In this manner, according to Patent Document No. 5, a dense bulk body should be obtained. However, to increase the density of the bulk magnet from such a point of view, the particle size distribution must be controlled to be an ideal one. That is why actually it is difficult to increase the density. In fact, the density obtained in the working example of Patent Document No. 5 is 94% of the alloy's true density. And a density of 96% or more is still hard to achieve even according to Patent Document No. 5. On top of that, it will take a very long time to increase the density sufficiently, which is also a problem.

To make the nanocomposite bulk magnet of the present invention, first, a molten alloy having the composition described above is prepared. Then, the molten alloy is quenched, thereby making a rapidly solidified alloy having a thickness of less than 40 μm (which is a quenching process). The nanocomposite bulk magnet of the present invention cannot be obtained just by setting the composition of the alloy within the ranges defined above. But in the process step of quenching the melt, the quenching condition should also be optimized so as to obtain a thin rapidly solidified alloy with a uniform thickness of less than 40 μm.

Generally speaking, to make a thin rapidly solidified alloy by melt-quenching process, an appropriate amount of molten alloy needs to be fed onto the surface of a chill roller that is rotating at high velocities with an atmospheric gas at an appropriate pressure, and the melt has its heat dissipated quickly by contacting with the surface of the chill roller. That is why compared to a situation where a relatively thick rapidly solidified alloy is made with a chill roller that is rotating at lower velocities, the thinner rapidly solidified alloy has been quenched more rapidly, and therefore, tends to amorphize more easily. However, if one tried to make a bulk body of a powder of a rapidly solidified alloy that has amorphized almost entirely, then those amorphous phases would crystallize so rapidly during the heating and pressing process to turn the powder into a bulk body that the intended uniform and fine crystal structure could not be formed and a high-performance nanocomposite magnet could not be obtained, which is a problem.

In the α-Fe based nanocomposite magnets disclosed in Patent Documents Nos. 1 and 2, which were developed earlier than the Ti-including α-Fe based nanocomposite magnets, the rapidly solidified alloy that has just been obtained by the quenching process is usually in almost entirely amorphous state. And if a magnetic powder obtained by pulverizing such a rapidly solidified alloy were turned into a bulk body, then those amorphous phases would crystallize so rapidly during the heating and pressing process to turn the powder into a bulk body that the intended uniform and fine crystal structure could not be formed and a high-performance nanocomposite magnet could not be obtained in the end, which is a problem.

Furthermore, if a bulk compact were made of an alloy powder that has already been crystallized to a certain degree, then it would be difficult to increase the density sufficiently and reduce the number of surface voids. That is why according to Patent Document No. 5, an alloy powder including amorphous phases (of which the volume fraction may be 30% or more, for example) is preferably used and a 100% amorphous powder is used in one of its working examples. Even so, a high-performance nanocomposite magnet cannot be obtained, either, for the same reason as what has been described above.

To avoid such a problem, according to the present invention, a powder, of which 30 vol % or more is already crystalline phases, is prepared before the compaction process. The crystalline phases include $R_2T_{14}B$ and α-Fe phases with an average crystal grain size of 100 nm or less. For that purpose, the rapidly solidified alloy that has just been obtained through the quenching process should include at least 30 vol % of crystalline phases by controlling the quenching rate. To obtain such a rapidly solidified alloy, however, the quenching rate should be decreased to a certain degree. This is quite the opposite of increasing the quenching rate to reduce the thickness of the rapidly solidified alloy. And to decrease the quenching rate appropriately, the quenching process conditions, including the roller surface velocity of the chill roller, the pressure of the cooling gas atmosphere, and the melt feeding rate, should be strictly controlled. Specifically, to obtain a rapidly solidified alloy that has a thickness of less than 40 μm and that already has 30 vol % or more of crystalline phases in the as-quenched state, the quenching process conditions are preferably controlled so that the roller surface velocity is within the range of 15 m/s to 30 m/s, the atmospheric gas pressure is within the range of 0.1 kPa to 101.3 kPa, the melt feeding rate per orifice of the teeming nozzle is within the range of 0.5 kg/min to 2 kg/min (if there are multiple orifices, this rate should be multiplied by the number of orifices), and the melt quenching rate is within the range of $5 \times 10^{4\circ}$ C./s to $5 \times 10^{7\circ}$ C./s. It should be noted that these conditions will vary slightly according to the melt-quenching machine to use. In this case, the volume fraction of the crystalline phases that are included in the rapidly solidified alloy is determined by an in-magnetic-field TG curve that has been plotted with a thermomagnetic balance. In the in-magnetic-field TG curve that has been measured in the temperature range of room temperature to 1,000° C. with respect to a rapidly solidified alloy including amorphous phases, the magnetic force variation that is observed at lowest temperatures is caused by the amorphous phases, and the magnitude of that variation is supposed to be the volume fraction of the amorphous phases. First of all, a rapidly solidified alloy that has the same composition as the rapidly solidified alloy to evaluate and that consists of amorphous phases only is made and its magnetic force variation is obtained and supposed to be a reference value $\Delta a_0$. Next, the magnetic force variation $\Delta a_1$ of the amorphous phases of the rapidly solidified alloy to evaluate is obtained. And the volume fraction of the crystalline phases is calculated by $\{1-(\Delta a_1/\Delta a_0)\}\times 100$. It should be noted that the rapidly solidified alloys that have been measured are supposed to have the same weight.

The rapidly solidified alloy thus obtained is pulverized, and classified if necessary, thereby making a powder, at least 90 mass % of which is accounted for by powder particles with a major-axis size of more than 53 µm. Optionally, the powder of the rapidly solidified alloy, of which the crystalline phases have a volume fraction of 30 vol % or more, may be further heated and crystallized. And then the powder may be compacted after having had the volume fraction of its crystalline phases increased in this manner.

According to the present invention, the powder particles have the volume fraction of their crystalline phases controlled to 30 vol % or more before being compacted. That is why the problem that the structure of the magnet loses its uniformity due to an uncontrollable crystal growth during the compaction process can be overcome. As a result, the magnet structure of the bulk body of the present invention becomes a fine crystal structure including 5 vol % to 60 vol % of α-Fe phase with an average crystal grain size of 1 nm to 50 nm and 40 vol % to 95 vol % of $Nd_2Fe_{14}B$ phase with an average crystal grain size of 5 nm to 100 nm. In the nanocomposite bulk magnet of the present invention, an $R_2Fe_{14}B$ type compound phase with a relatively large crystal grain size and an α-Fe phase with a smaller crystal grain size than the $R_2Fe_{14}B$ type compound phase coexist, thus realizing excellent nanocomposite magnet performance.

As described above, the bulk magnet of the present invention is densely filled with flat powder particles that are stacked one upon the other, and the powder particles themselves are directly combined with each other. In the interface between those particles combined, a metal layer has been formed as will be described later. And probably that metal layer contributes to the excellent nanocomposite magnet properties of the bulk magnet of the present invention. Hereinafter, it will be described exactly how that metal layer is formed and how much the metal layer contributes to improving the magnetic properties.

According to the present invention, most of the very narrow gaps left between the powder particles that have been loaded during the press compaction process are located between the planes of adjacent flat powder particles as shown in FIG. 2(a). While the density of the magnet is being increased by going through a hot press process, the ingredients of the magnet are dissolved and fill those gaps, thereby forming a very thin metal layer on a nanometer scale (e.g., with a thickness of 50 nm to 300 nm). And that thin metal layer combines the powder particles together, thereby forming a bulk magnet. The bulk magnet of the present invention has a small R content (or mole fraction), and therefore, that metal layer includes a lot of Fe. Hereinafter, such a metal layer will be referred to herein as a "combining metal layer".

That combining metal layer includes at least R, Ti and Fe. During the hot press process, the surface of the powder particles loaded would be slightly oxidized due to the presence of a very small amount of oxygen in the gaps between those particles. A rare-earth element R is more easily oxidizable than Fe. That is why during the hot press process, an R oxide would be deposited out of the $R_2Fe_{14}B$ phase at the surface of the powder particles, thus decomposing the $R_2Fe_{14}B$ phase into Fe and Fe—B easily. And that Fe or Fe—B would produce solid-phase diffusion and form an Fe-rich phase of a metal including Fe and B in the gaps between the powder particles. In the Fe-rich phase, the R oxide is present as a spherical R-rich phase. Likewise, Ti is also present as a Ti-rich phase in the combining metal layer. Thus, the combining metal layer that has been formed in this manner between the powder particles is a nanostructure including a very thin layer of an iron-based alloy as its integral part and can function as a soft magnetic phase as a whole. That is why even in the nanocomposite magnet, the combining metal layer does not interfere with the magnetic coupling between the hard and soft magnetic phases via the exchange interactions. As a result, according to the present invention, even if the powder is turned into a bulk body, deterioration of the nanocomposite magnet properties can be avoided. Although it is not quite clear how and why that combining metal layer has such a nanostructure, such a structure has been realized for the first time by the present invention and the nanometer scale structure of that combining metal layer would contribute immensely to realizing nanocomposite magnetic properties.

Furthermore, in the combining metal layer, Fe should be present as either α-Fe or Fe—B. However, it is preferred that more α-Fe be included than Fe—B because α-Fe has higher magnetization than Fe—B. In the bulk magnet of the present invention, by setting the C content in the magnet's composition to be an appropriate one, α-Fe can be included in a greater percentage in the combining metal layer and the magnetic properties of the bulk magnet of the present invention can be further improved. This improvement is done probably for the following reasons. The bulk magnet of the present invention is a Ti including nanocomposite magnet that includes Ti in its composition. However, Ti tends to bond to B in the magnet's composition and form a non-magnetic Ti—B compound easily. In the Ti including nanocomposite magnet, to minimize the decline in magnetic properties due to the production of the Ti—B compound, C, which has no less affinity for Ti than B, is often added. However, the present inventors discovered that in the bulk magnet of the present invention, if too much C were added, Fe included in the combining metal layer would be present as Fe—B more often than as α-Fe with high magnetization, thus rather interfering with the improvement of the magnetic properties. Specifically, in the bulk magnet of the present invention, the mole fraction q of the substituent C may be up to 50%. However, for the reasons described above, q is preferably 40% or less, and more preferably 30% or less. In the bulk magnet of the present invention, in the manufacturing process step of making a magnetic powder to make a bulk magnet, a relatively thin rapidly solidified alloy with a thickness of less than 40 µm is obtained at a relatively high quenching rate and then pulverized. That is why the Ti—B compound is not produced so easily and the magnetic properties do not deteriorate so significantly as the conventional Ti-including nanocomposite magnet even if the C content is zero.

Figure 9:
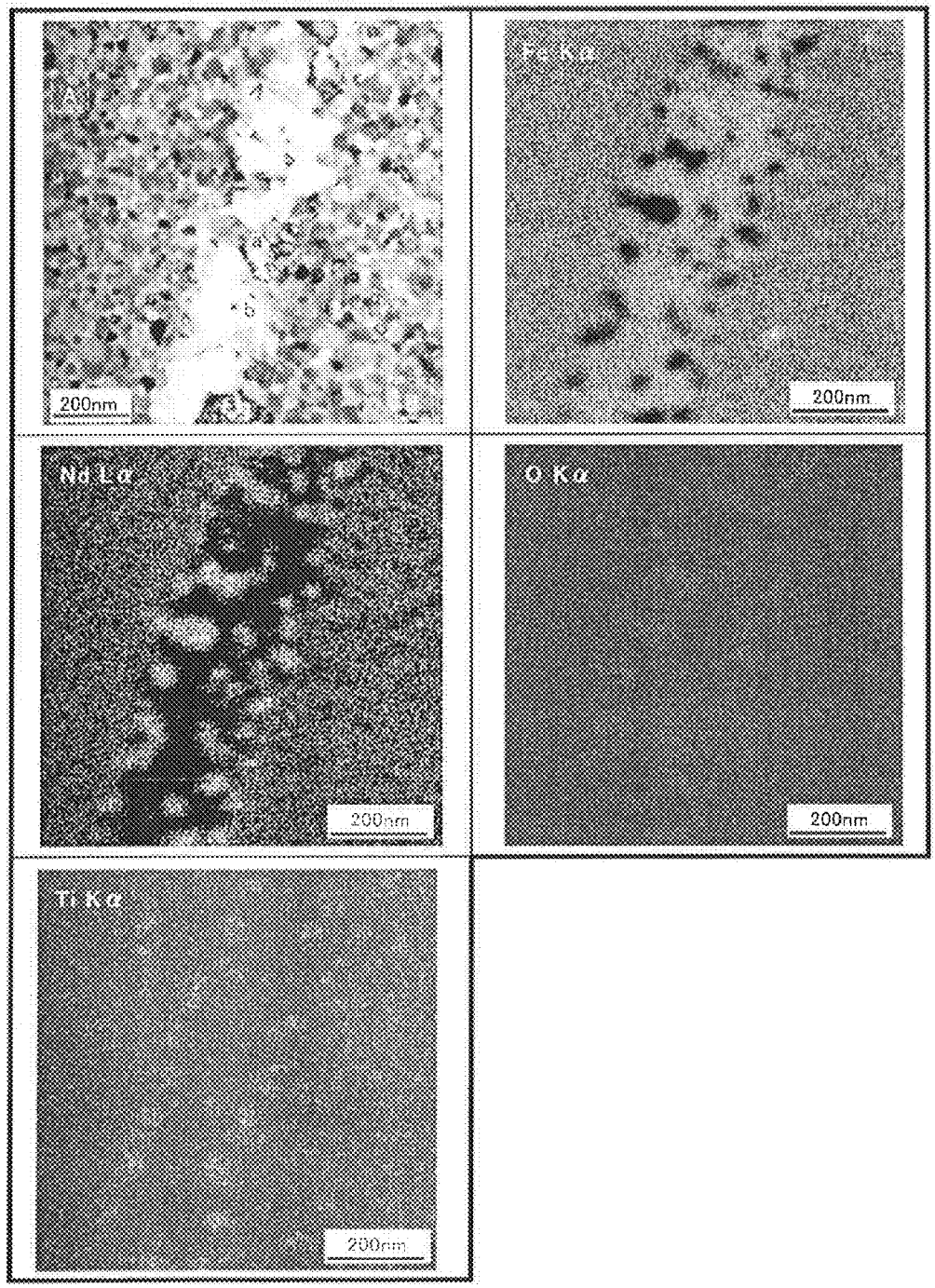
FIG. 9 is a photograph showing the metal structure of Example #3 and element mapping photographs.

FIG. 9 shows TEM-EDX mapping photographs of the combining metal layer in a specific example of the present invention (which will be described in detail later). At both ends of the combining metal layer, there are granular Nd-rich phases. Even though its content is too much lower than Nd's to identify it on the TEM-EDX mapping photographs easily, a very small amount of Ti is also present as spherical Ti-rich phases in the combining metal layer. The rest of the combining metal layer other than Nd and Ti is mostly Fe-rich phases, which accounts for 75 at % or more of Fe. It should be noted that boron is a light element and therefore could not be analyzed according to this technique.

As can be seen from FIG. 9, most of oxygen is present so as to overlap with Nd. That is to say, Nd includes its oxides, which means that Nd has been oxidized preferentially. The Fe-rich phase may have an oxygen content of 20 at % or less (according to a quantitative analysis using an EDX).

In the bulk magnet of the present invention, its magnetic properties hardly deteriorate even after the magnetic powder has been turned into a bulk body, and its recoil curve also behaves similarly to the powder's. These effects should be achieved due to the presence of the combining metal layer described above only by the bulk magnet of the present invention. That is to say, since the combining metal layer is a very thin layer of a nanometer scale including a lot of Fe that is not easily oxidizable, that combining metal layer should play the role of producing magnetic coupling between the main phases of adjacent powder particles, which face each other through the combining metal layer, via the exchange interactions.

On the other hand, conventional R—Fe—B based permanent magnets other than the nanocomposite magnets include R at a high mole fraction, which contributes greatly to coupling the powder particles together. That is why in those conventional permanent magnets, the gaps between the powder particles consist mostly of the rare-earth element R. Consequently, the exchange interactions between the powder particles that are realized by the present invention are never seen in those conventional magnets. On top of that, since a lot of R is dissolved during the hot press process, the amount of effective rare-earth metal decreases and the magnetic properties deteriorate as a result.

In the bulk magnet of the present invention, there is very little oxygen in those extremely narrow gaps between the powder particles loaded during the hot press process of its manufacturing process, and the density of the magnet increases rapidly. Thus, when the powder particles are heated to a high temperature during the hot press process, the amount of oxygen included in the gaps between those powder particles in the bulk magnet of the present invention should be much smaller than in the conventional bulk magnet. As a result, oxidation of Fe in the combining metal layer never advances in the bulk magnet of the present invention.

On the other hand, as disclosed in Patent Documents Nos. 3, 4 and 5, if a bulk body is made of powder particles that have been obtained by pulverizing a relatively thick quenched alloy, broader gaps tend to be left as shown in FIG. 2(b) than in the present invention. In that case, a greater amount of oxygen should be included in those gaps and the density of the magnet will increase more slowly. Thus, when the powder particles are heated to a high temperature, a lot of oxygen should be included in those gaps. As a result, in the conventional magnets, the combining layer should be oxidized more easily, and become thicker and less uniform, than in the bulk magnet of the present invention. Consequently, in the conventional magnets, exchange interactions would be produced much less easily between the powder particles than in the bulk magnet of the present invention.

Hereinafter, preferred embodiments of a nanocomposite bulk magnet according to the present invention will be described.

Alloy Composition

The rare-earth element R is at least one of the rare-earth metals and includes substantially no La or Ce. If the mole fraction y of R were less than 6 at %, $H_{cJ}$ greater than 400 kA/m could not be achieved and the resultant permanent magnet could not be used actually. On the other hand, if the mole fraction y of R exceeded 10 at %, the α-Fe phase contributing to the magnetization of the magnet would account for 5% or less and the remanence $B_r$ would be 0.9 T or less. For these reasons, the mole fraction y of R is preferably 6 at % to 10 at %, more preferably 7 at % to 10 at %, and even more preferably 8 at % to 9.7 at %.

If the combined mole fraction x of B (boron) and C (carbon) were less than 4 at %, the amorphous forming ability would decrease too significantly to obtain the desired uniform microstructure and a remanence $B_r$ of 0.9 T or more could not be achieved. Meanwhile, if the mole fraction x exceeded 10 at %, nucleation of soft magnetic phases such as $Fe_3B$, $Fe_{3.5}B$ and $Fe_{23}B_6$ would prevail over α-Fe and it would be difficult to realize a remanence $B_r$ of 0.9 T or more. That is why the mole fraction x is preferably 4 at % to 10 at %, more preferably 5 at % to 9.5 at %, and even more preferably 5.5 at % to 9 at %.

If B is partially replaced with C, then the amorphous forming ability of the quenched alloy will improve, which contributes to controlling the quenched structure of the powder effectively. That is to say, the unwanted situation where the magnet performance varies significantly with the melt-quenching rate can be avoided and excellent nanocomposite magnets can be mass-produced with good stability. Nevertheless, if the percentage q of the substituent C exceeded 50%, the magnetic properties might deteriorate. That is why the upper limit of the percentage q of the substituent carbon is set to be 50%. The percentage q of the substituent C is preferably 40% or less, more preferably 30% or less.

Ti increases the coercivity $H_{cJ}$, remanence $B_r$ and maximum energy product $(BH)_{max}$ and improves the loop squareness of the demagnetization curve. If the mole fraction z of Ti were less than 0.05 at % of the entire magnet, then the effects to be achieved by adding Ti could not be achieved fully. Nevertheless, if the mole fraction z of Ti exceeded 5 at %, then the volume fraction of the amorphous phases, remaining in the alloy that has been heated and crystallized, would increase so much as to decrease the remanence $B_r$ easily. In view of these considerations, the mole fraction z of Ti is preferably from 0.05 at % to 5 at %. The lower limit of a more preferred z range is 0.5 at % and the upper limit thereof is 4 at %. The upper limit of an even more preferred z range is 3 at %.

The transition metal T, including Fe as an essential element, is the balance of the alloy other than the elements described above. Even if Fe is partially replaced with Co and/or Ni, desired hard magnetic properties are still realizable. However, if more than 50% of Fe were replaced with T, then a remanence $B_r$ of 0.5 T or more could not be achieved. For that reason, the percentage of the substituent T should fall within the range of 0% to 50%.

It should be noted that if Fe is partially replaced with Co, the loop squareness of the demagnetization curve will improve and the Curie temperature of the $R_2Fe_{14}B$ phase will rise to increase the thermal resistance effectively. Also, during the melt-quenching process such as a melt spinning process or a strip casting process, the viscosity of the molten alloy decreases, which stabilizes the melt-quenching process advantageously. The percentage of Fe to be replaced with Co is preferably 0.5% to 15%.

Optionally, at least one additive element M, selected from the group consisting of Al, Si, V, Cr, Mn, Cu, Zn, Ga, Zr, Nb, Mo, Ag, Hf, Ta, W, Pt, Au and Pb, may be added as well. By adding such an element, the magnetic properties are further improvable effectively. In addition, the best heat treatment temperature range can also be expanded. Nevertheless, if the mole fraction n of these elements M exceeded 10 at %, then the magnetization would decrease. Therefore, the mole fraction n of M is preferably 0 at % to 10 at %, more preferably 0.1 at % to 5 at %.

Melt Quenching Machine

In a preferred embodiment of the present invention, the molten alloy is brought into contact with the surface of a metallic chill roller, which is spinning at a high velocity, thereby removing heat from the molten alloy and quenching and solidifying the alloy. To bring an appropriate amount of molten alloy into contact with the surface of the chill roller, the molten alloy is preferably fed onto the chill roller through an orifice, of which the inside diameter is narrowed to about 0.5 mm to several mm, for example.

The molten alloy that has been fed onto the surface of the chill roller is quenched by the chill roller and then leaves the surface of the chill roller, thereby forming a rapidly solidified alloy ribbon.

In this preferred embodiment, a material alloy is prepared by using a melt quenching machine such as the one shown in FIG. 3. The alloy preparation process is performed within an inert atmosphere to prevent the material alloy, which includes a rare-earth element R and Fe that are easily oxidizable, from being oxidized. The inert gas may be either a rare gas of helium or argon, for example, or nitrogen. A rare gas of helium or argon is preferred to nitrogen, because nitrogen reacts with the rare-earth element R relatively easily. If the atmospheric gas pressure were too low, the oxidation of the material alloy could not be reduced sufficiently. In addition, the secondary cooling effects, which should otherwise be achieved by the atmospheric gas that cools the molten alloy that has left the chill roller, would decrease, too. On the other hand, if the atmospheric gas pressure were too high, then a significant percentage of the atmospheric gas would get trapped between the molten alloy and the chill roller, thus also making it very difficult to quench the alloy sufficiently with the chill roller. For these reasons, the atmospheric gas pressure preferably falls within the range of 0.1 kPa to 101.3 kPa (that is the atmospheric pressure). Also, either only one orifice or multiple orifices may be used. Optionally, the orifice may have a slit shape. Even so, the slit preferably has a width of 0.5 mm to several mm.

The machine shown in FIG. 3 includes a material alloy melting chamber 1 and a material alloy quenching chamber 2, in which a vacuum or an inert atmosphere is created at an adjustable pressure. Specifically, FIG. 3(a) illustrates an overall arrangement of the machine, while FIG. 3(b) illustrates a part of the machine on a larger scale.

As shown in FIG. 3(a), the melting chamber 1 includes: a melt crucible 3 to melt, at an elevated temperature, a material 20 that has been mixed to have a desired magnet alloy composition; a reservoir 4 with a teeming nozzle 5 at the bottom; and a mixed material feeder 8 to supply the mixed material into the melt crucible 3 while maintaining an airtight condition. The reservoir 4 stores the melt 21 of the material alloy therein and is provided with a heater (not shown) to maintain the temperature of the melt teemed from it at a predetermined level.

The quenching chamber 2 includes a rotating chill roller 7 for rapidly quenching and solidifying the melt 21 that has been dripped through the teeming nozzle 5.

In this machine, the atmosphere and pressure inside the melting and quenching chambers 1 and 2 are controllable within prescribed ranges. For that purpose, atmospheric gas inlet ports 1b, 2b and 8b and outlet ports 1a, 2a and 8a are arranged at appropriate positions of the machine. In particular, the gas outlet port 2a is connected to a pump to control the absolute pressure inside the quenching chamber 2 within a range of 0.1 kPa to 101.3 kPa (that is the atmospheric pressure).

The melt crucible 3 may define a desired tilt angle to pour the melt 21 through a funnel 6 into the reservoir 4. The melt 21 is heated in the reservoir 4 by the heater (not shown).

The teeming nozzle 5 of the reservoir 4 is positioned on the boundary wall between the melting and quenching chambers 1 and 2 to drip the melt 21 in the reservoir 4 onto the surface of the chill roller 7, which is located under the nozzle 5. The orifice diameter of the teeming nozzle 5 may be 0.5 mm to 2.0 mm, for example. If the viscosity of the melt 21 is high, then the melt 21 cannot flow through the teeming nozzle 5 easily. In this embodiment, however, the pressure inside the quenching chamber 2 is kept lower than the pressure inside the melting chamber 1. Thus, an appropriate pressure difference is created between the melting and quenching chambers 1 and 2, and the melt 21 can be teemed smoothly. It should be noted that the pressure difference does not always have to be made between the melting and quenching chambers 1 and 2. Without that pressure difference, however, the surface level of the melt should be raised with respect to the nozzle position so that the melt can drop smoothly due to its own weight. The difference in pressure between the orifice level and the melt surface level is should be at least 3 kPa and preferably 7 kPa or more.

The chill roller 7 preferably includes a base made of carbon steel, tungsten, iron, copper, molybdenum, beryllium or an alloy thereof, because such a base has excellent thermal conductivity and durability. The base of the chill roller 7 preferably has its surface plated with chromium, nickel or a mixture thereof. This is because the surface strength of the roller can be increased and the surface of the roller base can be protected with the coating and will not be melted or damaged while the melt is being quenched. The chill roller 7 may have a diameter of 300 mm to 500 mm, for instance. The water-cooling capability of a water cooler provided inside the chill roller 7 is calculated and adjusted based on the latent heat of solidification and the volume of the melt teemed per unit time.

Melt Quenching Process

First, the melt 21 of the material alloy, which is represented by the compositional formula described above, is prepared and stored in the reservoir 4 of the melting chamber 1 shown in FIG. 3. Next, the melt 21 is dripped through the teeming nozzle 5 onto the chill roller 7 to contact with, and be rapidly quenched and solidified by, the chill roller 7 within a low-pressure Ar atmosphere. In this manner, a rapidly solidified alloy ribbon 22 is obtained. In this case, an appropriate rapid solidification process, making the quenching rate controllable precisely, should be adopted.

If the single-roller quenching process is adopted, the thickness of the rapidly solidified alloy ribbon and the quenching rate of the molten alloy are controllable by the roller surface velocity of the chill roller or the volume of the melt to be teemed onto the surface of the chill roller per unit time. The roller surface velocity is preferably controlled within the range of 15 m/s to 30 m/s, while the volume of the melt teemed per orifice of the teeming nozzle is preferably controlled within the range of 0.5 kg/min to 2 kg/min. If the chill roller has such a structure that makes its temperature adjustable by water cooling, the quenching rate of the molten alloy is also controllable by the flow rate of the cooling water flowing inside the chill roller. That is to say, by adjusting at least one of the roller surface velocity, the volume of the melt teemed and the flow rate of the cooling water depending on the necessity, the quenching rate of the molten alloy can be controlled to the range defined by the present invention.

In this preferred embodiment, in quenching and solidifying the melt 21, the quenching rate of the molten alloy is adjusted to the range of $5\times10^{4}$° C./s to $5\times10^{7}$° C./s. By controlling the quenching rate within this range, the intended nanocomposite structure can be obtained with good stability.

The period of time during which the molten alloy 21 is quenched by the chill roller 7 is equivalent to an interval between a point in time the alloy contacts with the outer surface of the rotating chill roller 7 and a point in time the alloy leaves the roller 7. In the meantime, the alloy has its temperature decreased to be a supercooled liquid. Thereafter, the supercooled alloy 22 leaves the chill roller 7 and travels within the inert atmosphere. While the rapidly solidified alloy ribbon 22 is traveling, the alloy has its heat dissipated into the atmospheric gas. As a result, the temperature of the alloy further drops. The pressure of the atmospheric gas is preferably set to be within the range of 0.1 kPa to 101.3 kPa (that is the atmospheric pressure). Thus, the rapidly solidified alloy 22 can make an even closer contact with the chill roller 7, and the heat of the alloy can be removed by the chill roller 7 even more effectively, and the $Nd_2Fe_{14}B$ compound and α-Fe can nucleate and grow finely and uniformly in the rapidly solidified alloy. More preferably, the pressure of the atmospheric gas is set to be within the range of 1.3 kPa to 101.3 kPa (that is the atmospheric pressure). Then, the $Nd_2Fe_{14}B$ compound can nucleate and grow even more uniformly and finely in the rapidly solidified alloy 22. It should be noted that unless an appropriate amount of Ti were added to the material alloy, then the α-Fe phase would nucleate and grow faster and earlier in the rapidly solidified alloy 22 that has gone through the quenching process described above, thus deteriorating the resultant magnetic properties.

According to this preferred embodiment, by controlling the roller surface velocity within the range of 15 m/s to 30 m/s and the volume of the melt teemed per orifice of the teeming nozzle within the range of 0.5 kg/min to 2 kg/min and by setting the pressure of the atmospheric gas to be 1.3 kPa or more, a rapidly solidified alloy 22 including a fine $R_2T_{14}B$ type compound phase with an average crystal grain size of 100 nm or less and an α-Fe phase is obtained so as to have a thickness of less than 40 μm. By smoothing the roller surface and by controlling the atmospheric gas pressure, the thickness of the rapidly solidified alloy 22 can have an increased degree of uniformity. According to the present invention, the thickness of the rapidly solidified alloy 22 preferably has a standard deviation σ of 4 μm or less, more preferably 2 μm or less.

Pulverization Process

According to this preferred embodiment, a rapidly solidified alloy ribbon is fractured to a thickness of several mm to several ten mm, and then coarsely pulverized to a thickness of approximately 1 mm or less with a power mill or a roller mill machine. After that, the coarse powder is further pulverized to the desired particle size with a pin disk mill or a roller mill machine, for example, and then classified.

Figure 4:
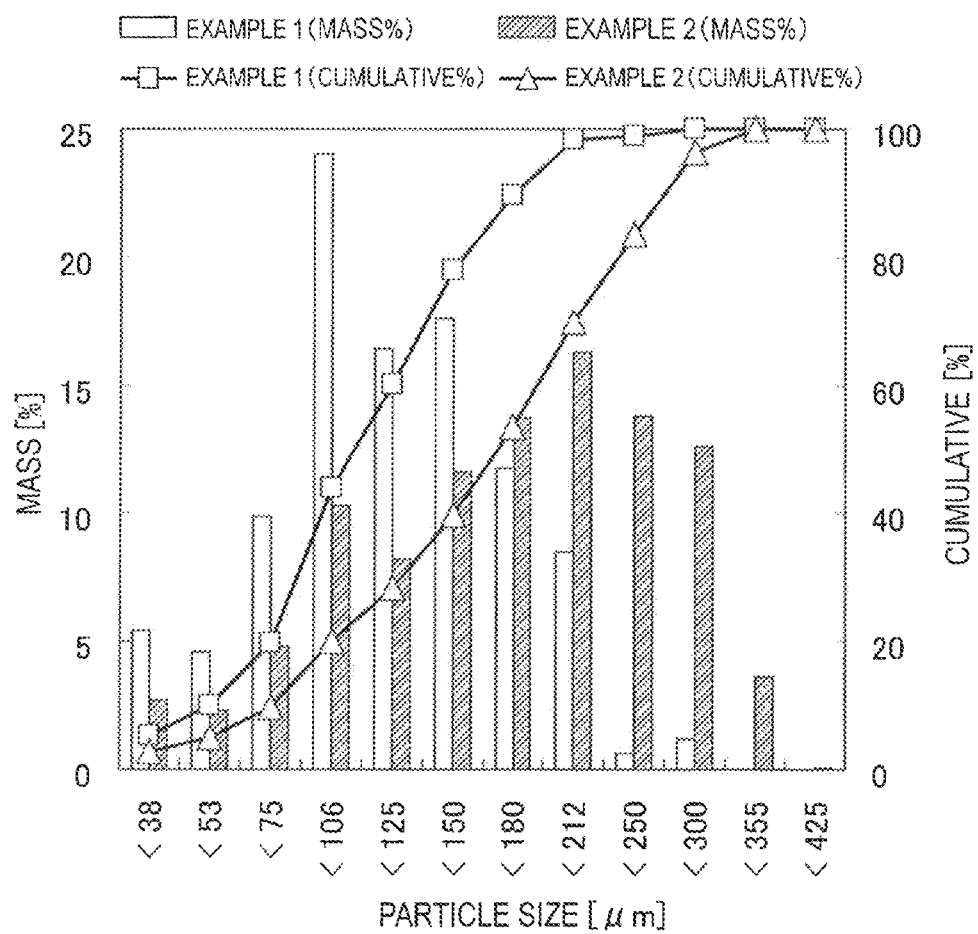
FIG. 4 is a graph showing the particle size distributions of powders representing specific examples of the present invention.

The powder thus obtained has a particle size distribution such as the one shown in FIG. 4.

Heat Treatment

According to the present invention, a rapidly solidified alloy, of which at least 30 vol % is crystalline phases even in the as-quenched state, is used. This rapidly solidified alloy may be turned into bulk as it is. Alternatively, the rapidly solidified alloy may also have the volume fraction of its crystalline phases increased by going through a heat treatment, be crystallized completely, and then turned into bulk. If the powder of the rapidly solidified alloy is thermally treated to be crystallized, the heat treatment process is preferably carried out within an argon atmosphere in a preferred embodiment. Preferably, the alloy is heated to a temperature of 500° C. to 800° C. at a temperature rise rate of 0.5° C./s to 10° C./s, maintained at the temperature of 500° C. to 800° C. for a period of time of 30 seconds to 20 minutes, and then cooled to room temperature.

This heat treatment process results in nucleation and/or growth of fine crystals from an amorphous phase remaining in the rapidly solidified alloy. According to the present invention, the nanocrystalline $Nd_2Fe_{14}B$ phase already accounts for at least 30 vol % of the as-cast alloy that has not been thermally treated yet. Thus, α-Fe and other crystalline phases will not increase their sizes too much and the respective constituent phases other than the $Nd_2Fe_{14}B$ phase (i.e., soft magnetic phases) will be dispersed finely and uniformly. After the heat treatment process, the $Nd_2Fe_{14}B$ phase accounts for 65 vol % to 95 vol % of the alloy.

If the heat treatment temperature were lower than 500° C., then the amorphous phases in the rapidly solidified alloy could not be crystallized and the desired magnetic properties could not be realized. On the other hand, if the heat treatment temperature exceeded 800° C., the grain growth of the respective crystal grains would advance too much, thus weakening the exchange interactions between the respective magnetic phases and decreasing the remanence $B_r$ to less than 0.9 T. For these reasons, the heat treatment temperature is preferably 550° C. to 780° C., more preferably 580° C. to 750° C.

If the temperature rise rate during the heat treatment process for crystallization were less than 0.5° C./s, then no uniform microstructure could be obtained and a remanence $B_r$ of 0.9 T or more could not be achieved. There is no particular upper limit to the preferred temperature rise rate range to obtain a uniform microstructure. However, if the temperature rise rate were too high, then it would take a while to get the temperature that has been raised to the target stabilized at that temperature. That is why considering the design of the heat treatment system, the temperature rise rate preferably falls within the range of 0.5° C./s to 10° C./s, more preferably 1° C./s to 7° C./s, and even more preferably 1° C./s to 6° C./s.

It is not so important how long the alloy should be maintained at the predetermined temperature. However, to carry out a highly reproducible heat treatment process with good stability, the alloy is preferably kept at that temperature for at least 1 minute.

To prevent the alloy from being oxidized, the heat treatment is preferably conducted within an inert gas (e.g., Ar or $N_2$ gas) atmosphere or an inert gas such as Ar gas or $N_2$ gas having a reduced pressure. Alternatively, the heat treatment may also be carried out in a vacuum of 0.1 kPa or less.

In the present invention, the $Nd_2Fe_{14}B$ compound phase can be crystallized uniformly and finely in the quenched alloy. For that reason, even if the quenched alloy powder were not thermally treated and crystallized, the solidified alloy itself could still exhibit good enough magnet properties when subjected to the compaction process after that. Consequently, the heat treatment for crystallization is not an essential process for the present invention.

According to the present invention, if the α-Fe phase accounted for less than 5 vol % of the resultant nanocomposite magnet alloy, then a remanence $B_r$ of 0.9 T or more could not be achieved. However, if α-Fe accounted for 60 vol % or more of the magnet alloy, then the volume fraction of the $Nd_2Fe_{14}B$ phase contributing to expressing the coercivity would be too low to achieve an $H_{cJ}$ of 400 kA/m or more. To realize good enough magnetic properties, the volume fraction of α-Fe is preferably 7% to 60%, more preferably 10% to 45%. The rest of the nanocomposite magnet alloy, other than the α-Fe, consists mostly of the $Nd_2Fe_{14}B$ phase.

If the α-Fe had an average crystal grain size of more than 50 nm, then the number of α-Fe crystal grains, which are multi-axis crystals, would increase, and therefore, a remanence $B_r$ of 0.9 T or more could not be achieved. Meanwhile, it is virtually impossible to produce α-Fe with an average crystal grain size of less than 1 nm in an alloy according to the present invention. For these reasons, the average crystal grain size of α-Fe is preferably 1 nm to 30 nm, more preferably 1 nm to 20 nm. It should be noted that if the crystal grains of α-Fe had a standard deviation of 10 nm or more, then no uniform fine structure could be obtained and the exchange interactions acting on the respective particles would decrease as a whole. As a result, the remanence $B_r$ and the loop squareness of the demagnetization curve would both decrease. That is why the standard deviation of the crystal grain sizes is preferably 8 nm or less, more preferably 6 nm or less.

Also, if the average crystal grain size of the $Nd_2Fe_{14}B$ phase were less than 5 nm, a coercivity $H_{cJ}$ of 400 kA/m or more could not be achieved. On the other hand, if the average crystal grain size of the $Nd_2Fe_{14}B$ phase were more than 100 nm, then a remanence $B_r$ of 0.9 T or more could not be achieved. For these reasons, the average crystal grain size of the $Nd_2Fe_{14}B$ phase is preferably 10 nm to 70 nm, more preferably 10 nm to 50 nm. Furthermore, if the standard deviation of the crystal grain sizes of the $Nd_2Fe_{14}B$ phase were 15 nm or more, then no uniform fine structure could be obtained and the exchange interactions acting on the respective particles would decrease as a whole. As a result, the remanence $B_r$ and the loop squareness of the demagnetization curve would both decrease. That is why the standard deviation is preferably 13 nm or less, more preferably 10 nm or less. The average crystal grain size can be obtained by performing an image analysis on a transmission electron microscope photograph.

Compaction Process

The powder thus obtained is pressed while being heated, thereby making a bulk magnet in which powder particles are directly combined with each other. Such a compaction process is preferably carried out using a hot press machine such as the one shown in FIG. 5.

Figure 5:
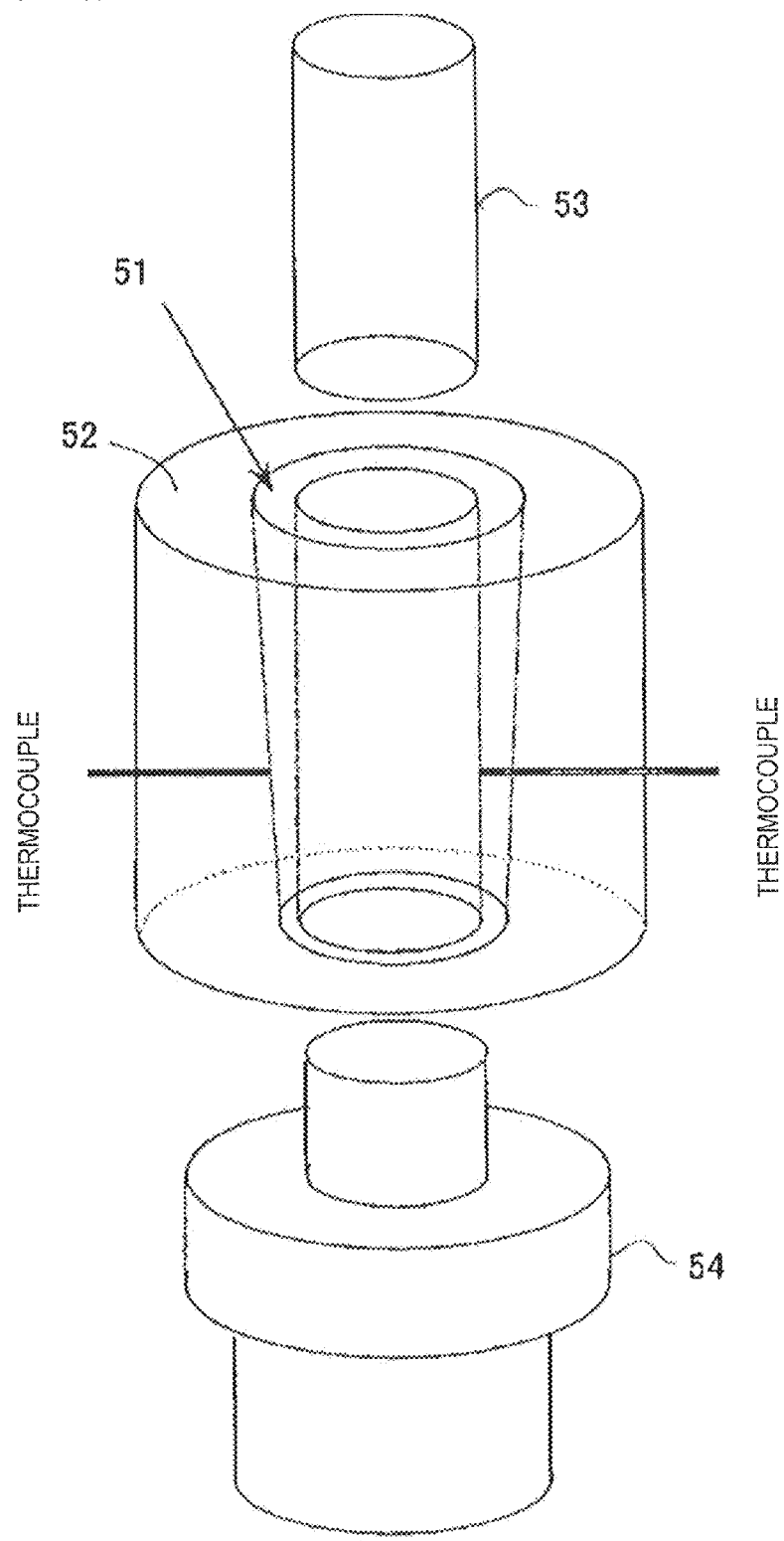
FIG. 5 illustrates an exemplary arrangement for a press machine that can be used effectively in the present invention.

FIG. 5 illustrates a die arrangement for a hot press machine that can be used effectively in a preferred embodiment of the present invention. This machine includes a die 52 of cemented carbide or carbon with an inner sleeve 51 and upper and lower punches 53 and 54 of cemented carbide or carbon. The upper punch is inserted through the top of a through hole, which is surrounded with the sleeve 51, while the lower punch is inserted through the bottom of the through hole. The powder is heated with a heater (not shown), which is arranged inside the vacuum vessel of this machine.

The die shown in FIG. 5 is filled with the powder and then set into this hot press machine. Then, the upper and lower punches 53 and 54 are driven in two opposite directions so as to narrow the gap between them, thereby applying uniaxial pressure to the powder while heating it. In this case, the temperature is controlled based on the sleeve temperature, which is actually measured with a thermocouple.

This pressing process is preferably carried out for at least 10 seconds and up to 30 minutes with a pressure of 50 MPa to 1,000 MPa applied and with the temperature set to be within the range of 500° C. to 850° C.

The compaction process for obtaining a bulk magnet does not always have to be performed with the machine shown in FIG. 5 but may also be carried out with a plasma sintering system or any other compacting machine.

Hereinafter, specific examples of the present invention will be described.

EXAMPLE #1 AND COMPARATIVE EXAMPLES #1 TO #3

A material alloy, which had been prepared by compounding respective elements of Nd, Pr, Fe, B, C, Ti, Nb and Zr (each having a purity of 99.5% or more) so as to have the composition shown in the following Table 1, was put into a melt crucible and then melted by being subjected to an induction heating process within an inert atmosphere, thereby making a molten alloy. Next, the molten alloy was poured into a reservoir with a teeming nozzle at the bottom, and then ejected through the orifice of the teeming nozzle onto the surface of a chill roller, which was arranged right under the orifice. The surface velocity of the chill roller was controlled to fall within the range of 16 m/s to 24 m/s. The molten alloy that had contacted with the surface of the chill roller in this manner was quenched by the chill roller. As a result, a strip of rapidly solidified alloy with the thickness shown in Table 1 was obtained.

As for Comparative Examples #1, #2 and #3, on the other hand, a strip of rapidly solidified alloy with the thickness shown in the following Table 1 was obtained using a strip caster such as the one disclosed in Japanese Patent Publication No. 3297676.

TABLE 1

| | Alloy Composition [at %] | Type of metal structure | Average thickness [μm] of rapidly solidified alloy ribbon | Particle size distribution [μm] | Percentage [mass %] of particles with sizes ≤53 μm |
|---|---|---|---|---|---|
| Ex. 1 | $Nd_9Fe_{84}B_6Ti_1$ | α-Fe based nanocomposite | 36 | <250 | <10 |
| Cmp. Ex. 1 | $Nd_6Pr_1Fe_{76}B_{12}C_1Ti_4$ | Fe—B based nanocomposite | 80 | <250 | 23.1 |
| Cmp. Ex. 2 | $Nd_9Fe_{73}B_{12.6}C_{1.4}Ti_3Nb_1$ | Fe—B based nanocomposite | 85 | <250 | 28.5 |
| Cmp. Ex. 3 | $Nd_{8.2}Fe_{77.6}B_{8.1}Co_{0.3}Ti_{1.5}Zr_{4.3}$ | α-Fe based nanocomposite | 75 | <250 | 22.5 |

Based on results of a powder XRD, the present inventors confirmed that the quenched alloys of samples representing Example #1 and Comparative Example #3 had a quenched alloy structure in which Nd amorphous phases and crystalline phases estimated to be $Nd_2Fe_{14}B$ phases and α-Fe phases coexisted. Also, by making an analysis with a thermomagnetic balance, the present inventors confirmed that crystalline phases accounted for 30 vol % or more of sample representing Example #1. We also confirmed that samples representing Comparative Examples #1 and #2 had a quenched alloy structure in which amorphous phases and crystalline phases estimated to be $Nd_2Fe_{14}B$ phases and Fe—B phases coexisted.

Figure 6:
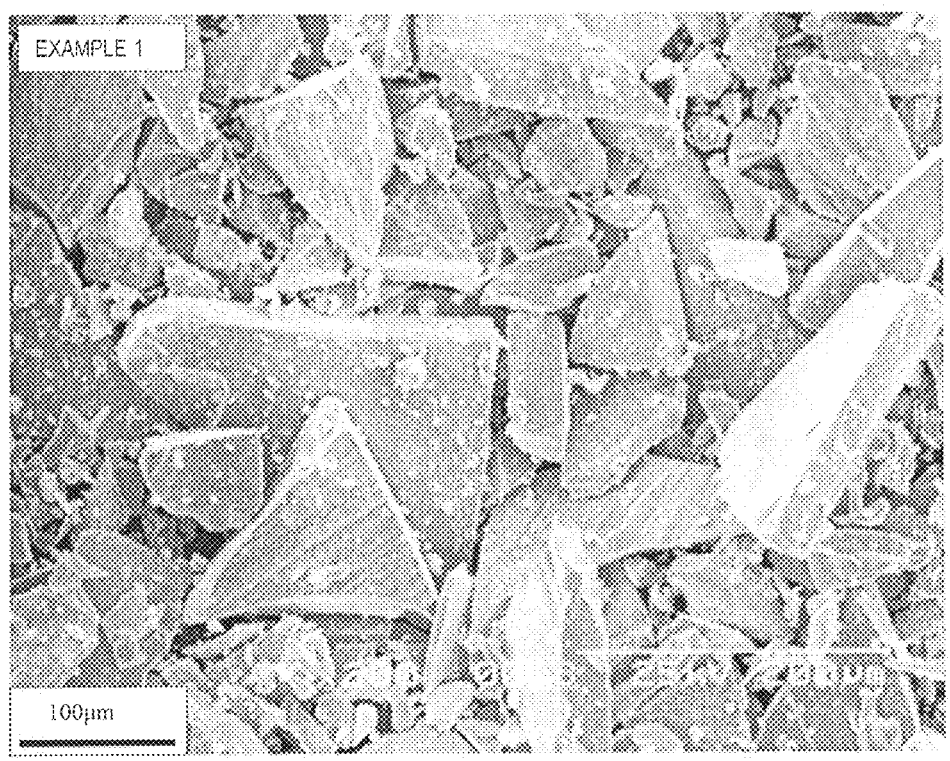
FIG. 6 is an SEM photograph showing powder particles (representing Example #1) for use to make a nanocomposite bulk magnet according to the present invention.
Figure 7:
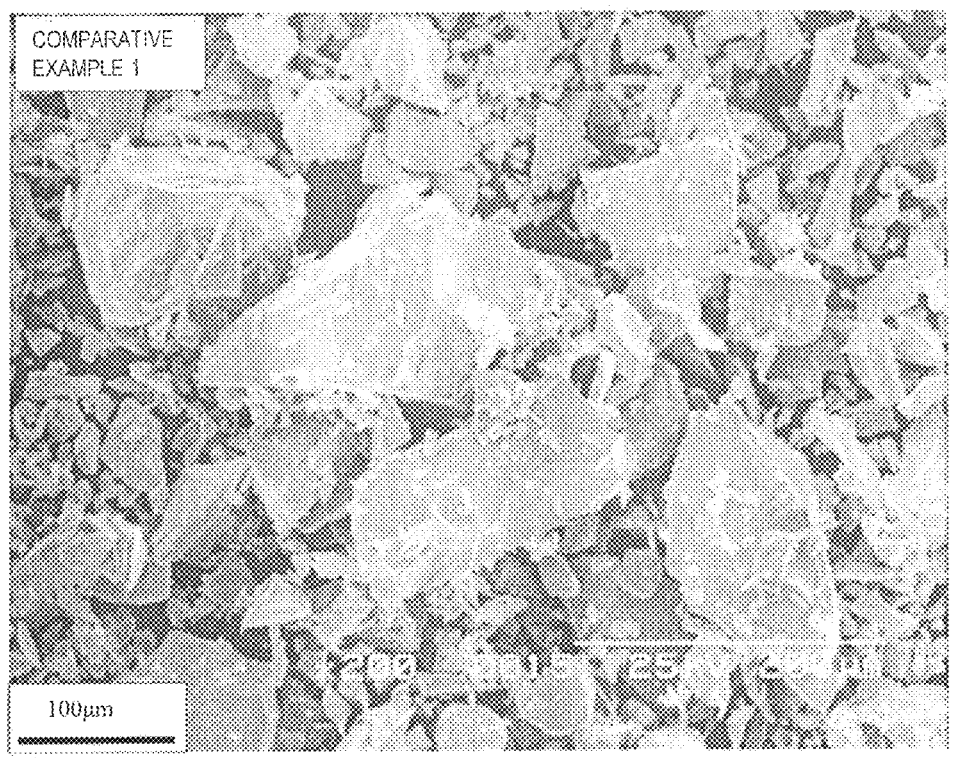
FIG. 7 is an SEM photograph showing powder particles (representing Comparative Example #1) for use to make a nanocomposite bulk magnet as a comparative example.
Figure 8:
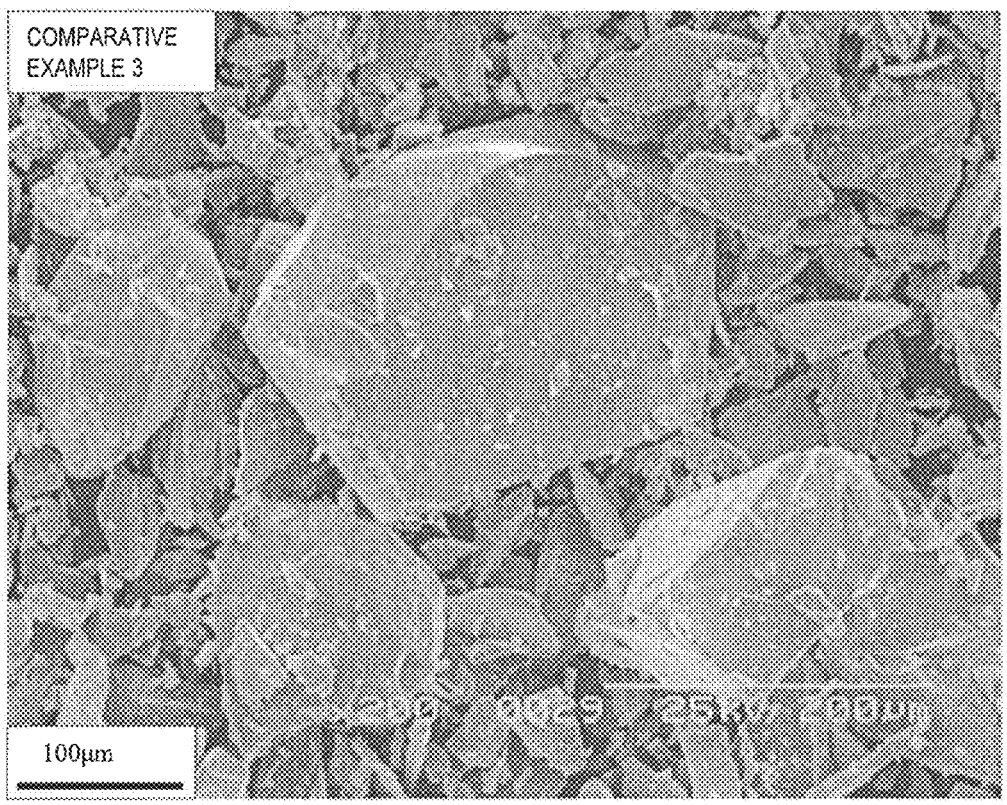
FIG. 8 is an SEM photograph showing powder particles (representing Comparative Example #3) for use to make a nanocomposite bulk magnet as another comparative example.

The quenched alloy ribbon was coarsely pulverized to a size of either 850 μm or less or 425 μm or less, and then finely pulverized. The pulverization process was carried out using a pin disk mill, which was rotated at 8,000 rpm or less in an inert gas so that the powder had a mean particle size of about 100 μm. After that, powder particles with sizes of 250 μm or more were removed. The proportion of fine particles with a major-axis size of 53 μm or less to the overall powder was less than 10 mass % in Example #1 but more than 20 mass % in each of Comparative Examples #1 to #3. FIG. 6 is an SEM photograph of the powder representing Example #1. On the other hand, FIGS. 7 and 8 are SEM photographs of the powders representing Comparative Examples #1 and #3, respectively.

The powder thus obtained was thermally treated to be crystallized within an Ar atmosphere. Each sample was thermally treated by keeping it heated to a temperature of 660° C. to 750° C. for 10 minutes.

Then, the thermally treated powder was pressed and compacted using the hot press machine shown in FIG. 5. A pressure of 583 MPa was applied to each sample for 10 minutes with the temperature set to be 700° C.

A bulk magnet obtained as a result of that compaction process had a circular cylinder shape with a diameter of 8 mm and a length of 9 mm.

The following Table 2 shows the density, the remanence $B_r$, the maximum energy product $(BH)_{max}$ and the coercivity $H_{cJ}$ that each of those magnetic powders and bulk magnets had. Table 2 also shows the compacting temperature, the compacting pressure, the ratio of the bulk magnet's density to the alloy's true density, and the percentage of decrease in coercivity with respect to the original magnetic powder's.

TABLE 2

| | | Shape | Compacting Temperature [° C.] | Compacting Pressure [MPa] | Density [g/cm³] | Bulk magnet's density/alloy's true density [%] | $B_r$ [T] | $(BH)_{max}$ [kJ/m³] | $H_{cJ}$ [kA/m] | Rate [%] of decrease in HcJ by turning into bulk |
|---|---|---|---|---|---|---|---|---|---|---|
| Ex. 1 | | Magnetic powder | — | — | 7.59 | — | 0.999 | 136 | 513 | 2.9 |
| | | Hot pressed compact (φ8 mm × 9 mm) | 700° C. × 4 min | 583 MPa | 7.48 | 98.5 | 0.996 | 130 | 498 | |
| Cmp. Ex. 1 | | Magnetic powder | — | — | 7.46 | — | 0.827 | 98 | 660 | 4.6 |
| | | Hot pressed compact (φ8 mm × 9 mm) | 700° C. × 4 min | 583 MPa | 7.12 | 95.5 | 0.799 | 83 | 629 | |
| Cmp. Ex. 2 | | Magnetic powder | — | — | 7.46 | — | 0.789 | 103 | 1026 | 4.8 |
| | | Hot pressed compact (φ8 mm × 9 mm) | 700° C. × 4 min | 583 MPa | 6.98 | 93.6 | 0.733 | 84 | 977 | |

TABLE 2-continued

| | Shape | Compacting Temperature [° C.] | Compacting Pressure [MPa] | Density [g/cm³] | Bulk magnet's density/ alloy's true density [%] | $B_r$ [T] | $(BH)_{max}$ [kJ/m³] | $H_{cJ}$ [kA/m] | Rate [%] of decrease in HcJ by turning into bulk |
|---|---|---|---|---|---|---|---|---|---|
| Cmp. Ex. 3 | Magnetic powder | — | — | 7.5 | — | 0.838 | 110 | 745 | −0.9 |
| | Hot pressed compact (φ8 mm × 9 mm) | 700° C. × 4 min | 583 MPa | 7.11 | 94.7 | 0.796 | 94 | 752 | |

In Table 2, the density of each magnetic powder was obtained by actually measuring the density of an ingot with the same composition (i.e., the true density).

As for Example #1, the structure of the thermally treated powder, including $Nd_2Fe_{14}B$ and α-Fe phases, was observed. Specifically, when its microstructure was observed with a transmission electron microscope, it was confirmed that a nanocomposite magnet structure had been formed as a mixture of $Nd_2Fe_{14}B$ phases with an average crystal grain size of 20 nm to 100 nm and α-Fe phases on the grain boundary of the $Nd_2Fe_{14}B$ phases. The grain boundary portion had a thickness of several nm to about 20 nm.

The bulk magnet representing Example #1 of the present invention had a density that was as high as 98.5% of the true density of the alloy. On the other hand, each of the bulk magnets representing comparative examples had a bulk magnet's density/alloy's true density ratio of less than 96%. That is to say, the densities of those bulk magnets never reached 96% of the alloy's true density. Likewise, as for the magnetic properties, Example #1 achieved a much higher remanence $B_r$ than Comparative Examples #1 to #3.

EXAMPLE 2 AND COMPARATIVE EXAMPLE 4

First of all, a powder representing Example #2 was prepared by performing substantially the same manufacturing process as that of Example #1 described above. The major difference from Example #1 lies in particle size distribution. Specifically, in Example #2, powder particles with a major-axis size of 53 μm or less account for 4.9 mass % of the entire powder and powder particles with a major-axis size of 425 μm or more are removed. On the other hand, Comparative Example #4 is not a nanocomposite magnet but has a single-phase magnet structure including only an $Nd_2Fe_{14}B$ phase as a magnetic phase.

The following Table 3 shows the alloy composition, the magnet type, the thickness of the rapidly solidified alloy, the particle size distribution, and the percentage of powder particles with a major-axis size of 53 μm or less with respect to Example #2 and Comparative Example #4:

TABLE 3

| | Alloy Composition [at %] | Type of metal structure | Average thickness [μm] of rapidly solidified alloy ribbon | Particle size distribution [μm] | Percentage [mass %] of particles with sizes ≤53 μm |
|---|---|---|---|---|---|
| Ex. 2 | $Nd_9Fe_{84}B_6Ti_1$ | α-Fe based nanocomposite | 36 | <425 | 4.9 |
| Cmp. Ex. 4 | $Nd_{11.2}Fe_{81.4}Co_{1.9}B_{5.5}$ | $Nd_2Fe_{14}B$ single-phase | 35 | <425 | 8.8 |

The following Table 4 shows the density, the remanence $B_r$, the maximum energy product $(BH)_{max}$ and the coercivity $H_{cJ}$ that each of the powders representing Example #2 of the present invention and Comparative Example #4 had. Table 4 also shows the compacting temperature, the compacting pressure, the volume fraction of the magnetic powder, and the percentage of decrease in coercivity with respect to the original magnetic powder's.

As can be seen from Table 4, Example #2 had a higher remanence $B_r$, and caused a much smaller percentage of decrease in coercivity $H_{cJ}$ by turning the magnetic powder into a bulk magnet, than Comparative Example #4. The coercivity $H_{cJ}$ decreased so significantly in Comparative Example #4 while turning its magnetic powder into a bulk magnet probably because the magnetic powder of that comparative example included a rare-earth element at so high a mole fraction as to be easily oxidizable. Thus, when heated during the hot press process, the magnetic powder would have been oxidized so much as to deteriorate the magnetic properties. On the other hand, according to the present invention, since the mole fraction of the rare-earth element R was lower than that of the single-phase alloy, the magnetic powder of the present invention was less easily oxidizable, and its magnetic properties deteriorated less easily in the hot press process, than in that comparative example.

TABLE 4

| | Shape | Compacting Temperature [° C.] | Compacting Pressure [MPa] | Density [g/cm³] | Bulk magnet's density/ alloy's true density [%] | $B_r$ [T] | $(BH)_{max}$ [kJ/m³] | $H_{cJ}$ [kA/m] | Rate [%] of decrease in HcJ by turning into bulk |
|---|---|---|---|---|---|---|---|---|---|
| Ex. 2 | Magnetic powder | — | — | 7.59 | — | 1.004 | 137 | 511 | 2.6 |
| | Hot pressed compact (φ8 mm × 9 mm) | 700° C. × 4 min | 583 MPa | 7.45 | 98.1 | 0.988 | 127 | 498 | |
| Cmp. Ex. 4 | Magnetic powder | — | — | 7.63 | — | 0.91 | 131 | 768 | 13 |
| | Hot pressed compact (φ8 mm × 9 mm) | 700° C. × 4 min | 583 MPa | 7.46 | 97.7 | 0.918 | 126 | 668 | |

EXAMPLE 3

A bulk magnet representing Example #3 of the present invention was obtained by compacting the same powder as Example #1 at a temperature of 700° C. for 10 minutes with a pressure of 392 MPa applied. The following Table 5 shows the magnetic properties of Example #3. FIG. 9 shows photographs representing the metal structure of Example #3 and element mapping photographs thereof.

In each of the element mapping photographs shown in FIG. 9, a portion with a lighter shade shows a region that included a lot of the element in question. A quantitative composition analysis was carried out on regions A, B, a and b in the metal structure photograph shown in FIG. 9.

In this case, each of the regions A and B was located inside of a particle and the area of analysis was supposed to be approximately 500 nm square. As for a combining metal layer, on the other hand, the region a of an Nd-rich phase and the region b of an Fe-rich phase were analyzed.

As can be seen from the element mapping photographs shown in FIG. 9, Fe-rich regions would have combined with each other to form a layer. Also, judging by the metal structure photograph, the thickness of the combined metal layer would be approximately 200 nm.

The following Table 6 shows the results of the quantitative analysis that was carried out on the regions A, B, a and b in the metal structure photograph using an EDX.

TABLE 6

| Region under measurement | Nd concentration [at %] | Fe concentration [at %] | Ti concentration [at %] | O concentration [at %] |
|---|---|---|---|---|
| A | 12.4 | 70.5 | 0.8 | 16.3 |
| B | 12.5 | 68.9 | 1.1 | 17.5 |
| A | 51.1 | 1.3 | — | 47.6 |
| B | 1.1 | 84.9 | — | 14.0 |

The Fe-rich phase had an Fe content of 84.9 at %. The thickness of the combining metal layer and the concentration of Fe in the Fe-rich phase were measured in each of the other samples. As a result, the combining metal layer had a thickness of 50 nm to 300 nm and the Fe-rich phase had an Fe content of 75 at %.

The respective combining metal layers of the samples representing Examples #1 and #2 were analyzed. As a result,

TABLE 5

| | Shape | Compacting Temperature [° C.] | Compacting Pressure [MPa] | Density [g/cm³] | Bulk magnet's density/ alloy's true density [%] | $B_r$ [T] | $(BH)_{max}$ [kJ/m³] | $H_{cJ}$ [kA/m] |
|---|---|---|---|---|---|---|---|---|
| Ex. 3 | Magnetic powder | — | — | 7.59 | — | 0.999 | 136 | 513 |
| | Hot pressed compact (φ8 mm × 9 mm) | 700° C. × 10 min | 392 MPa | 7.46 | 98.3 | 0.979 | 123 | 535 | those layers had the same thickness and the same composition as the combining metal layer that was observed in the sample representing Example #3.

FIG. 10 shows micrographs of a bulk magnet (representing an example of the present invention) that was obtained at a compacting pressure of 392 MPa. As can be seen from FIG. 10, there were very few gaps between the powder particles.

OTHER EXAMPLES

Hereinafter, other specific examples of the present invention will be described.

Specifically, a molten alloy having any of the compositions shown in the following Table 7 was made by the same method as the one used to make Example #1 and then quenched by a chill roller that was rotating at any of the surface velocities Vs shown in the following Table 7, thereby forming a ribbon of a nanocomposite magnet alloy. The ribbon thus obtained had an average thickness of 20 μm to 39 μm (i.e., less than 40 μm). In this case, the "average thickness" was obtained by measuring the thicknesses of the ribbon at 100 arbitrary points using a micrometer and then calculating their average.

TABLE 7

| Sample No. | Vs [m/s] | Nd [at %] | Other R [at %] | Fe [at %] | B [at %] | Ti [at %] | Co [at %] | C [at %] | M [at %] |
| --- | --- | --- | --- | --- | --- | --- | --- | --- | --- |
| 1 | 22 | 9 | — | bal. | 6 | 1 | — | — | — |
| 2 | 22 | 9 | — | bal. | 5.9 | 1 | — | 0.1 | Zr0.5 |
| 3 | 24 | 10 | — | bal. | 4.5 | 1 | — | — | Cu2 |
| 4 | 22 | 9 | La1 | bal. | 6 | 1 | — | — | Cu1 |
| 5 | 22 | 9 | La1 | bal. | 6 | 1 | 0.33 | — | Cu0.43 |
| 6 | 22 | 9 | La1 | bal. | 6 | 1 | — | — | — |
| 7 | — | 9.4 | — | bal. | 7 | 1.5 | — | — | — |
| 8 | 22 | 8 | — | bal. | 6 | 1 | — | — | — |
| 9 | 24 | 9 | — | bal. | 5.7 | 1 | — | 0.3 | — |
| 10 | 22 | 9 | — | bal. | 7 | 1 | — | — | — |
| 11 | 22 | 9 | — | bal. | 7 | 1.5 | — | — | — |
| 12 | 22 | 9 | — | bal. | 8 | 1 | — | — | — |
| 13 | 22 | 9 | — | bal. | 8 | 1.5 | — | — | — |
| 14 | 22 | 9 | — | bal. | 9 | 1 | — | — | — |
| 15 | 22 | 9 | — | bal. | 9 | 1.5 | — | — | — |
| 16 | 18 | 8 | — | bal. | 3.5 | 2 | 1 | 2.5 | Nb1.5 |
| 17 | 18 | 8 | — | bal. | 6.5 | 2 | 1 | 0.5 | Nb1.5 |
| 18 | 18 | 6.5 | — | bal. | 4 | 2 | — | 4 | Cr0.5Nb0.5 |
| 19 | 18 | 6.5 | — | bal. | 4 | 2 | — | 4 | Cr0.5Nb0.5 |
| 20 | 18 | 7 | — | bal. | 5 | 2 | — | 3 | Nb0.5 |
| 21 | 18 | 8 | — | bal. | 9 | 3 | 3 | — | Al0.25Nb0.5 |
| 22 | 18 | 9.5 | — | bal. | 6 | 5 | 2 | 2 | — |

Next, the nanocomposite magnet alloy was pulverized by the same method as the one applied to Example #1, thereby obtaining a powder having any of the particle sizes shown in the following Table 8. The powder particles had an average minor-axis size of less than 40 μm and powder particles with a major-axis size of more than 53 μm accounted for 90 mass % or more of the entire powder. After that, the powder was pressed by the same method as in Example #1 at any of the compacting pressures and temperatures and for any of the periods of time shown in the following Table 8 and then the powder compact was cooled with Ar gas, thereby obtaining a bulk magnet of the present invention.

TABLE 8

| Sample No. | Powder particle size [μm] | Compacting pressure [MPa] | Temperature [° C.] | Time [min] |
| --- | --- | --- | --- | --- |
| 1 | <250 | 580 | 680 | 8 |
| 2 | <250 | 580 | 700 | 10 |
| 3 | <250 | 196 | 700 | 10 |
| 4 | <250 | 580 | 700 | 10 |
| 5 | <250 | 580 | 700 | 10 |
| 6 | <250 | 580 | 700 | 10 |
| 7 | <425 | 580 | 700 | 10 |
| 8 | <425 | 580 | 680 | 10 |
| 9 | <250 | 441 | 700 | 10 |
| 10 | <250 | 490 | 700 | 10 |
| 11 | <250 | 539 | 720 | 8 |
| 12 | <250 | 490 | 700 | 10 |
| 13 | <250 | 539 | 720 | 8 |
| 14 | <425 | 580 | 700 | 10 |
| 15 | <425 | 580 | 720 | 8 |
| 16 | <425 | 580 | 700 | 10 |
| 17 | <425 | 580 | 700 | 10 |
| 18 | <425 | 580 | 680 | 8 |
| 19 | <250 | 580 | 760 | 0.5 |

TABLE 8-continued

| Sample No. | Powder particle size [μm] | Compacting pressure [MPa] | Temperature [° C.] | Time [min] |
| --- | --- | --- | --- | --- |
| 20 | <250 | 392 | 700 | 10 |
| 21 | <250 | 580 | 700 | 10 |
| 22 | <250 | 580 | 700 | 10 |

Each of the bulk magnets eventually obtained had its density, magnetic powder percentage, remanence $B_r$, maximum energy product $(BH)_{max}$ and coercivity $H_{cJ}$ measured. The results are shown in the following Table 9. The density of each bulk magnet was 96% or more of the alloy's true density.

TABLE 9

| Sample No. | Density [g/cm³] | bulk magnet's density/alloy's true density [%] | $B_r$ [T] | $(BH)_{max}$ [kJ/m³] | $H_{cJ}$ [kA/m] |
|---|---|---|---|---|---|
| 1 | 7.54 | 99.2 | 0.984 | 127 | 513 |
| 2 | 7.41 | 97.5 | 0.953 | 125 | 568 |
| 3 | 7.30 | 96.1 | 0.859 | 82.7 | 443 |
| 4 | 7.49 | 98.5 | 0.892 | 104 | 515 |
| 5 | 7.51 | 98.9 | 0.931 | 116 | 546 |
| 6 | 7.44 | 97.9 | 0.918 | 119 | 546 |
| 7 | 7.48 | 99.1 | 0.903 | 113 | 599 |
| 8 | 7.43 | 99.1 | 1.013 | 126 | 453 |
| 9 | 7.42 | 99.0 | 0.941 | 116 | 534 |
| 10 | 7.43 | 99.0 | 0.921 | 116 | 510 |
| 11 | 7.46 | 99.4 | 0.938 | 118 | 554 |
| 12 | 7.43 | 99.1 | 0.882 | 106 | 498 |
| 13 | 7.45 | 99.4 | 0.883 | 112 | 596 |
| 14 | 7.45 | 99.3 | 0.894 | 114 | 591 |
| 15 | 7.43 | 99.1 | 0.861 | 107 | 568 |
| 16 | 7.48 | 99.7 | 0.924 | 97.3 | 565 |
| 17 | 7.47 | 99.6 | 0.931 | 114 | 564 |
| 18 | 7.49 | 99.9 | 0.975 | 95.7 | 408 |
| 19 | 7.53 | 100 | 0.901 | 89.3 | 456 |
| 20 | 7.43 | 99.0 | 0.928 | 101 | 463 |
| 21 | 7.37 | 98.2 | 0.837 | 107 | 594 |
| 22 | 7.37 | 98.2 | 0.854 | 111 | 799 |

INDUSTRIAL APPLICABILITY

The nanocomposite bulk magnet of the present invention is a high-density full-dense magnet with no resin or any other binder that is a non-magnetic material, and therefore, can exhibit fully high magnetic properties that its magnetic components essentially have. In addition, the magnet of the present invention has so high a magnet density that the magnet has high mechanical strength and high corrosion resistance.

REFERENCE SIGNS LIST 1b, 2b, 8b atmospheric gas inlet port
1a, 2a, 8a gas outlet port
1 melting chamber
2 quenching chamber
3 melt crucible
4 reservoir
5 teeming nozzle
6 funnel
7 rotating chill roller
21 melt
22 rapidly solidified alloy
51 sleeve
52 die
53 upper punch
54 lower punch

The invention claimed is:

1. A method for producing a nanocomposite bulk magnet, the method comprising the steps of:
   providing a melt of an alloy having a composition represented by the compositional formula:
   $T_{100-x-y-z-n}(B_{1-q}C_q)_x R_y Ti_z M_n$, where T is at least one transition metal element that is selected from the group consisting of Fe, Co and Ni and that always includes Fe, R is at least one rare-earth element including substantially no La or Ce, and M is at least one metallic element selected from the group consisting of Al, Si, V, Cr, Mn, Cu, Zn, Ga, Zr, Nb, Mo, Ag, Hf, Ta, W, Pt, Au and Pb, and the mole fractions x, y, z, n and q satisfy the inequalities of:
   4 at %≤x≤10 at %,
   6 at %≤y≤10 at %,
   0.05 at %≤z≤5 at %,
   0 at %≤n≤10 at %, and
   0≤q≤0.5, respectively,
   quenching the melt to make a rapidly solidified alloy, at least 30 vol % of which is crystalline phases that include an $R_2T_{14}B$ phase and an α-Fe phase and that have an average crystal grain size of 100 nm or less and the balance of which is amorphous phases and which has a thickness of less than 40 μm;
   pulverizing the rapidly solidified alloy, thereby obtaining a powder, at least 90 mass % of which is accounted for by powder particles with a major-axis size of more than 53 μm; and
   compacting the powder while heating and pressing the powder, thereby making a bulk body in which nanocomposite magnet powder particles including the $R_2T_{14}B$ phase and the α-Fe phase are combined together and of which the density is 96% or more of the true density of the alloy.

2. The method of claim 1, wherein the step of quenching the melt includes quenching the melt at a quenching rate of $5 \times 10^{4\circ}$ C./s to $5 \times 10^{7\circ}$ C./s.

3. The method of claim 1, wherein the step of quenching the melt includes controlling the standard deviation σ of the thickness of the rapidly solidified alloy to 4 μm or less.

4. The method of claim 1, wherein the step of compacting includes crystallizing the amorphous phases of the powder particles, thereby forming a nanocomposite magnet structure, 5 vol % to 60 vol % of which is accounted for by an α-Fe phase with an average crystal grain size of 1 nm to 50 nm and 40 vol % to 95 vol % of which is accounted for by an $R_2T_{14}B$ phase with an average crystal grain size of 5 nm to 100 nm.

* * * * *